United States Patent
Hwang et al.

(10) Patent No.: US 7,428,424 B2
(45) Date of Patent: *Sep. 23, 2008

(54) APPARATUS AND METHOD FOR POWER CONTROL OF DOWNLINK SHARED CHANNEL IN MOBILE COMMUNICATION SYSTEM

(75) Inventors: Sung-Oh Hwang, Yongin-shi (KR); Sung-Ho Choi, Songnam-shi (KR); Kook-Heui Lee, Songnam-shi (KR); Ho-Kyu Choi, Songnam-shi (KR); Hyun-Woo Lee, Suwon-shi (KR); Jae-Yeol Kim, Kunpo-shi (KR)

(73) Assignee: Samsung Electronics Co., Ltd. (KR)

( * ) Notice: Subject to any disclaimer, the term of this patent is extended or adjusted under 35 U.S.C. 154(b) by 752 days.

This patent is subject to a terminal disclaimer.

(21) Appl. No.: 09/971,510

(22) Filed: Oct. 4, 2001

(65) Prior Publication Data

US 2002/0077141 A1    Jun. 20, 2002

(30) Foreign Application Priority Data

Oct. 4, 2000  (KR) .......................... 2000-0058321
Oct. 9, 2000  (KR) .......................... 2000-0059356
Oct. 11, 2000 (KR) .......................... 2000-0059872

(51) Int. Cl.
  *H04B 17/00* (2006.01)
  *H04B 7/00*  (2006.01)

(52) U.S. Cl. .................. 455/522; 455/115.3; 455/226.2

(58) Field of Classification Search ......... 455/423–425, 455/67.11, 67.13, 67.14, 68, 69, 70, 115.1–115.4, 455/226.1–226.4, 522–525, 436

See application file for complete search history.

(56) References Cited

U.S. PATENT DOCUMENTS

| 5,715,526 | A   |   | 2/1998  | Weaver, Jr. et al. |
| 6,343,218 | B1  | * | 1/2002  | Kaneda et al. ............ 455/522 |
| 6,473,624 | B1  | * | 10/2002 | Corbett et al. ............ 455/522 |
| 6,480,481 | B1  | * | 11/2002 | Park et al. .................. 370/342 |

(Continued)

FOREIGN PATENT DOCUMENTS

EP        0975185 A   *   1/2000

(Continued)

OTHER PUBLICATIONS

Russian Official Action (including English translation) for Appln. No. 2002114548/09 dated May 27, 2003.

(Continued)

*Primary Examiner*—Duc M. Nguyen
*Assistant Examiner*—Michael Thier
(74) *Attorney, Agent, or Firm*—The Farrell Law Firm, PC

(57) ABSTRACT

An apparatus and method for controlling the transmission power of a DSCH in a mobile communication system is disclosed. In the DSCH transmission power controlling method, a UE generates information for controlling the transmission power of the DSCH based on a channel condition determined by the reception power of a CPICH from a node B transmitting the DSCH to the UE, and then transmits the power control information to the node B.

19 Claims, 20 Drawing Sheets

U.S. PATENT DOCUMENTS 6,621,809 B1 * 9/2003 Lee et al. .................... 370/335
6,650,905 B1 * 11/2003 Toskala et al. ............. 455/522
6,771,965 B2 * 8/2004 Hamabe .................... 455/442

FOREIGN PATENT DOCUMENTS

| JP | 11-308657 | | 11/1999 |
|----|-----------|---|---------|
| RU | 2156545 | | 9/2002 |
| WO | WO 95/08897 | * | 3/1995 |
| WO | WO 02/01893 | | 1/2002 |

OTHER PUBLICATIONS

Australian Examiner's Report dated Mar. 7, 2003, issued in a counterpart application, namely, Appln. No. 94301/01.

Nokia: "DSCH Power Control", 3GPP TSG RAN WG1#14, Jul. 2000.

Nokia: "DSCH Power Control Improvement in Soft Handover: Proposed Draft TR", 3GPP TSG RAN WG1#15, Aug. 2000.

* cited by examiner

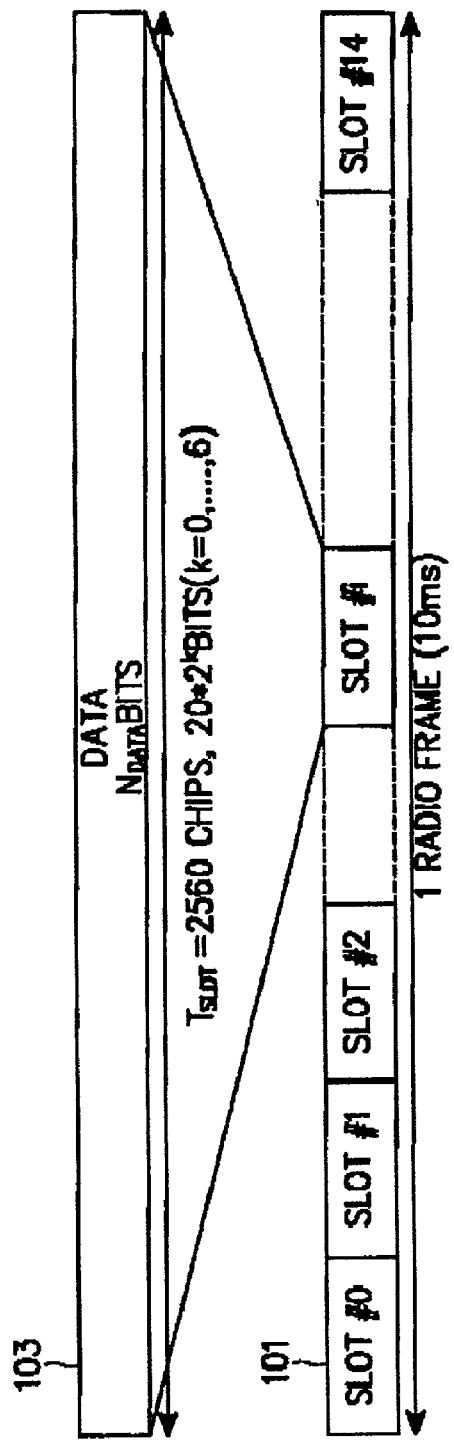
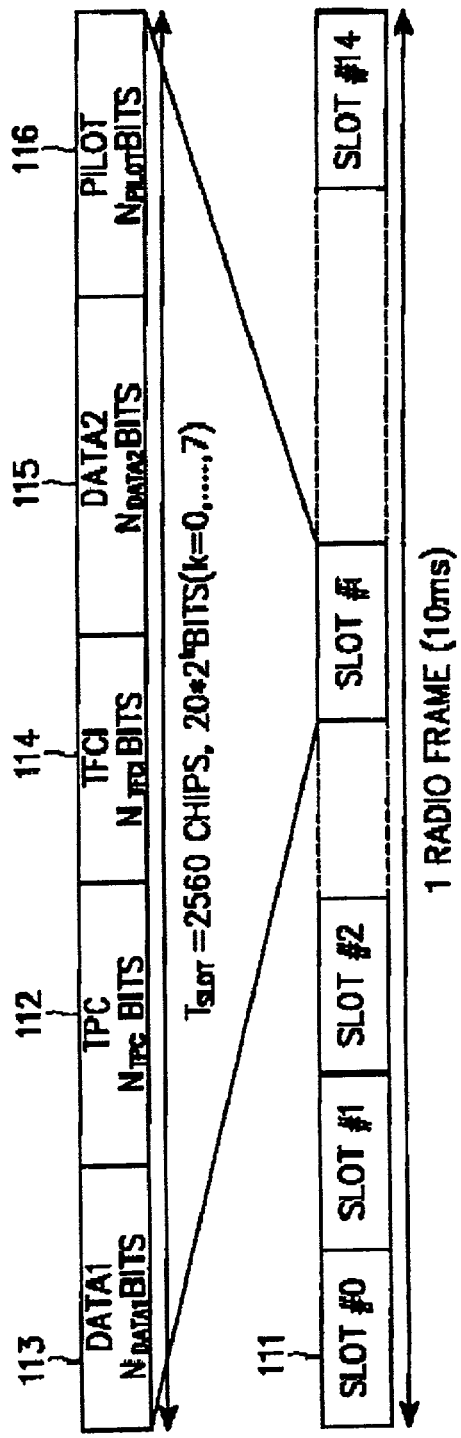
FIG. 1A DSCH STRUCTURE
FIG. 1B DL_DCH STRUCTURE

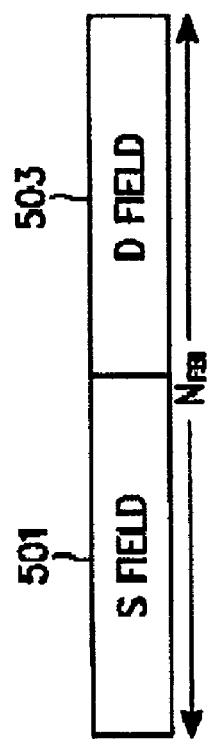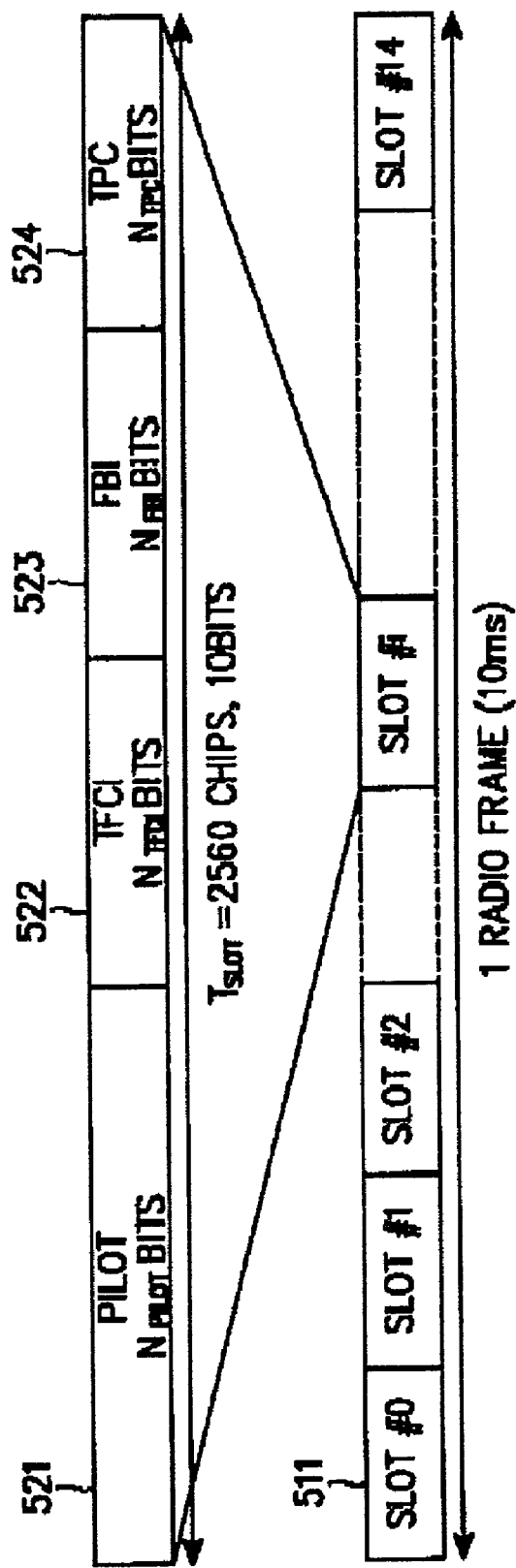
FIG. 5A
FIG. 5B

APPARATUS AND METHOD FOR POWER CONTROL OF DOWNLINK SHARED CHANNEL IN MOBILE COMMUNICATION SYSTEM

PRIORITY

This application claims priority to an application entitled "Apparatus and Method for Power Control of Downlink Shared Channel in Mobile Communication System" filed in the Korean Industrial Property Office on Oct. 4, 2000 and assigned Ser. No. 2000-58321, an application entitled "Apparatus and Method for Power Control of Downlink Shared Channel in Mobile Communication System" filed in the Korean Industrial Property Office on Oct. 9, 2000 and assigned Ser. No. 2000-59356, and an application entitled "Apparatus and Method for Power Control of Downlink Shared Channel in Mobile Communication System" filed in the Korean Industrial Property Office on Oct. 11, 2000 and assigned Ser. No. 2000-59872, the contents of which are hereby incorporated by reference.

BACKGROUND OF THE INVENTION

1. Field of the Invention

The present invention relates generally to transmission power control of a downlink shared channel (DSCH) in an asynchronous mobile communication system, and in particular, to an apparatus and method for controlling the transmission power of a DSCH for a user equipment (UE) in a handoff region.

2. Description of the Related Art

The DSCH used in the European asynchronous future mobile communication system known as "WCDMA" is shared by multiple UEs. The DSCH is designed to transmit packet data or other high rate data to UEs in 10-ms radio frames. The DSCH supports a variable data rate for data transmitted at a frame level and can be power-controlled on a slot basis like the dedicated channel (DCH) established between a node B and a UE in WCDMA. A radio frame is a signal transmission unit of 10 ms for WCDMA and includes 15 slots. The DSCH transmits user data only and its power control is carried out by a downlink dedicated channel (DL_DCH) assigned together with the DSCH. The DSCH can be transmitted to a single UE in several frames or in a single frame. Which UE to transmit the DSCH to and when to transmit the DSCH to the UE are scheduled by the higher layer.

For thorough understanding of the DSCH, its structure will be described with reference to FIG. 1A. In FIG. 1A, reference numeral 101 denotes a 10-ms DSCH radio frame and reference numeral 103 denotes a slot. The DSCH radio frame 101 includes 15 slots and the single DSCH slot 103 is 2560 chips long. The volume of information transmitted in the DSCH slot 103 is inversely proportional to the spreading factor (SF) applied to the DSCH slot 103, ranging from 4 to 256.

FIG. 1B illustrates the structure of a DL_DCH assigned to a UE together with the DSCH shown in FIG. 1A by a node B. In FIG. 1B, reference numeral 111 denotes a DL_DCH radio frame. One DL_DCH slot includes Data 1 113, TPC (Transmit Power Control) 112, TFCI (Transmit Format Combination Indicator) 114, Data 2 115, and Pilot 116. The DL_DCH slot may have a different structure according to the lengths of Data 1, TPC, TFCI, Data 2, and Pilot.

Data 1 113 and Data 2 115 are called a downlink dedicated physical data channel (DL_DPDCH) for transmitting user data and signaling information from the higher layer. TPC 112, TFCI 114, and Pilot 116 collectively form a downlink dedicated physical control channel (DL_DPCCH). TPC 112 transmits a command for controlling the transmission power of an uplink channel directed from the UE to the node B, TFCI 114 transmits a codeword notifying transmission of transport channels at different data rates on the DL_DCH when the case occurs, and Pilot 116 allows the UE to measure the transmission power of a downlink channel for power control of the downlink channel. Transport channels in the description of TFCI 114 function to connect the higher layer and the physical layer that physically controls the data transmission.

For power control of the DSCH in WCDMA, the UE receiving the DL_DCH 111 measures Pilot 116 shown in FIG. 1B and transmits a TPC command to the node B. The UE determines whether the reception power is acceptable from the pilot measurement. According to the power control command from the UE, the node B controls the transmission power of the DL_DCH and sets the transmission power of the DSCH to an appropriate level considering the data rates of the DL_DCH and the DSCH. The difference in transmission power between the DL_DCH and the DSCH is dependent on the data rates of the channels and can be easily calculated by known procedures.

Transmission of a TPC on a slot by slot basis from the UE enables power control for the DL_DCH on a slot by slot basis. This implies that the transmission power of the DSCH can also be controlled on a slot basis.

FIG. 2 illustrates the flow of uplink and downlink signals in the case where the UE receiving the DSCH is located in a soft handoff (SHO) region. For simplicity of description, a system with, only two node Bs are considered here. The SHO occurs when the UE moves to a region where it receives a signal from both a source node B and a source target node B. In the SHO region, the UE communicates with both the node source and target B for a predetermined time. As the UE leaves the service region of the source node B, the quality of a signal from the source node B reaches an unacceptable level. The UE then releases channels from the source node B offering bad signal quality, connecting a call to the target node B offering good signal quality. This is called an SHO.

When the UE reaches the SHO region, it sums the transmission power of the source node B and the target node B and sets their transmission power to a mean value to allow the decrease of the transmission power of the node Bs to hand off a call without interruption. As a result, the transmission power of node Bs broadcasting signals to UEs within its coverage area is decreased, thereby reducing the influence of interference on adjacent UEs and node Bs.

This SHO procedure will be described in more detail referring to FIG. 2. Node B1 201 transmits a DSCH and a corresponding DL_DCH to a UE 211 and node B2 203 comes to transmit a DL_DCH to the UE 211 as the UE 211 moves toward it. A set of node Bs capable of transmitting signals to the UE 211 is called an active set. As the UE 211 receiving the DSCH enters the SHO region, the following problems may occur.

While the UE 211 receives both the DSCH and the DL_DCH from node B 1 201, it receives only the DL_DCH from node B2 203. The DSCH does not support the SHO because (1) it transmits high rate data relative to the DL_DCH, occupying more channel resources, (2) all node Bs in the active set must be provided with an SCH-supporting algorithm to support the SHO of the DSCH, which requires synchronization between the node Bs, (3) the asynchronous operations of node Bs in the asynchronous mobile communication system may cause timing-related problems, and (4) accurate scheduling of using time points for UEs due to the nature of the DSCH makes it difficult for a different node B to transmit the DSCH to the UE.

The DL_DCHs received from node B1 201 and node B2 203 are soft-combined for interpretation in the UE 211. The soft combination is a process of combining signals received at the UE 211. The purpose of soft combining is to reduce the influence of noise on received signals by summing the same information from different paths prior to interpretation. The soft combining operation is feasible only when the UE 211 receives the same information from different node Bs. If different information is received from each node B, soft combining merely increases noise components. Except for TPCs 112, the DL_DCHs are soft-combined. As the UE 211 roams, the signal strength of node B1 201 at the UE 211 may be strong, while that of node B2 203 may be weak, or vice versa. Due to the resulting possible difference between the TPCs, the TPCs of the DL_DCHs are interpreted separately without soft combining.

In determining a TPC for an uplink dedicated channel (UL_DCH) as shown in FIG. 2, the UE 211 sums signals received from node B1 201 and node B2 203 and checks whether the received signal level is acceptable. When the transmission power of the DSCH directed to the UE 211 in the SHO region is determined, problems as described below may arise from the TPC determination based on the mere sum or weighted sum of the received signals.

In the case where the UE 211 is located out of the SHO region and thus communicating with only the source node, the transmission power of the DSCH for the UE 211 is determined by adding the transmission power of the DL_DCH to a value reflecting the difference between the data rates between the DSCH and the DL_DCH. That is, the DSCH transmission power is bound with the DL_DCH. As the DL_DCH transmission power increases, the DSCH transmission power also increases, and vice versa. The DSCH can be transmitted to the UE 211 adaptively to the channel environment between the source node B1 201 and the UE 211. However, if the UE 211 is located in the SHO region, signals from other node Bs in the active set as well as a signal from the source node B1 201 transmitting the DSCH are involved in determining the TPC for the UL_DCH. To clarify the point with reference to FIG. 2, the DSCH transmission power must be determined considering the channel conditions between the UE 211 and node B1 201 and the DL_DCH transmission power must be determined considering the channel conditions between the UE 211 and node B1 201 and the UE 211 and node B2 203. In the prior art, since the DSCH transmission power is determined by adding a predetermined power value to the DL_DCH transmission power, application of a TPC according to the additional channel condition between the UE 211 and node B2 203 results in transmission of the DSCH with power above or below a desired power level. Another problem is encountered when node B1 201 transmits the DL_DCH with lower transmission power to the UE 211 in the SHO region than needed for transmitting the DL_DCH by itself. In this case, node B1 201 cannot apply the difference in transmission power between the DSCH and the DL_DCH for the non-SHO regions.

Many techniques have been proposed to solve the DSCH transmission power-related problems in the SHO region. One of the proposed techniques, shown in FIG. 3, utilizes site selection diversity transmit (SSDT) according to the WCDMA standards for DSCH transmission power control. For better understanding, it is supposed that an active set s includes two node Bs.

In the SSDT scheme, a temporary identification (ID) is assigned to each node B in the active set of a UE 311 located in an SHO region and a node B that can offer the best signal quality to the UE 311 is selected. Only the selected node B transmits a DL_DPDCH to the UE 311 and the other node B transmits only a DL_DPCCH to the UE 311, thereby reducing interference caused by simultaneous reception of DL_DPDCHs at the UE 311 from all node Bs in the active set to support the SHO. The node B transmitting a DL_DPDCH is called a primary node B, which is periodically updated, based on the measurement information in the UE 311. The primary node B is updated by transmitting its temporary ID to the other node Bs in the active set.

To control the DSCH transmission power using SSDT, the UE 311 receives common pilot channels (CPICHs) from node B1 301 and node B2 303 and determines a primary node B by comparing the pilot signal strengths of the CPICHs. Then the UE 311 transmits the temporary ID of the primary node B to each node B. A node B transmitting a DSCH among the node Bs receiving the temporary ID receives the temporary ID several times for a predetermined period and checks how many times the temporary ID indicates the node B. The node B determines whether to transmit the DSCH in a primary node B mode or in a non-primary node B mode.

For example, node B1 301 transmits both a DL_DCH and a DSCH to the UE 311. Node B2 303 is newly included in the active set of the UE 311 and transmits only a DL_DCH to the UE 311. After comparing the signal strengths of CPICHs from the node Bs, the UE 311 transmits the temporary ID of a primary node to node B1 301, as the primary node and node B2 303. If the temporary ID designates node B1 301, node B1 301 determines the transmission power of the DSCH considering the TPC of a UL_DCH and factors caused by the movement of the UE 311 to the SHO region, for example, a power offset reflecting the transmission power decrement of the DL_DCH. That is, it is determined whether the DSCH transmission power is to be increased or decreased based on a TPC received from the UE 311. In the case where node B1 301 is a primary node B, the DSCH power control is performed in the same manner as for the UE 311 in a non-SHO region except that a required power offset is applied due to factors such as the transmission power decrement of the DL_DCH.

On the other hand, if node B2 303 is selected as a primary node B, node B1 301 transmits the DSCH with a fixed power offset applied to the UE 311, judging that the UE 311 becomes remote or the channel condition is bad. That is, node B1 301 transmits the DSCH with the preset power offset applied to the UE 311, neglecting a TPC received from the UE 311.

The above-described DSCH transmission power control relying on SSDT has the shortcomings described below. (1) When the UE 311 enters the SHO region, the transmission power of an individual DL_DCH from each node B is less than that of a DL_DCH transmitted by only one node B and the difference varies according to the number of node Bs in the active set. Moreover, since a TPC transmitted from the UE 311 for downlink power control is determined after the DL_DCHs from the node Bs are combined and then it is determined whether the signal quality is acceptable or not, the TPC determination is influenced by the channel condition between the UE 311 and the other node Bs as well as the channel condition between the UE 311 and the node B transmitting the DSCH. Therefore, although the node B transmitting the DSCH is a primary node B, there may exist an error between the DSCH transmission power determined based on the TPC of a UL_DCH and a desired DSCH transmission power. (2) When the UE is located in the SHO region, the DSCH-transmitting node B transmits the DSCH with a different fixed power offset according to whether it is a primary node B or not. If the DSCH-transmitting node B is not designated as a primary node B while the balance of reception power is set among node Bs in the active set, the DSCH may be transmitted with overpower. If the DSCH-transmitting node B becomes a primary node B, the DSCH can be transmitted with underpower. The application of a different fixed power offset according to a primary node B or a non-primary node B may bring about an error between the real DSCH transmission power and the desired DSCH transmission power.

SUMMARY OF THE INVENTION

It is, therefore, an object of the present invention to provide an apparatus and method for controlling the transmission power of a DSCH in a UE receiving the DSCH in an SHO region.

It is also an object of the present invention to provide an apparatus and method for controlling the transmission power of a DSCH using a relative power offset determined in a UE receiving the DSCH.

It is another object of the present invention to provide a method of determining a power offset considering the soft combining gain of DL_DCHs and the distance between a UE receiving a DSCH and a node B in the UE in order to control the transmission power of the DSCH transmitted from the node B.

It is also another object of the present invention to provide a method of determining a power offset by measuring the strengths of CPICHs and dedicated pilot signals received from node Bs in the active set in a UE receiving a DSCH in order to control the transmission power of the DSCH transmitted from a node B.

It is a further object of the present invention to provide an apparatus and method for transmitting a power offset in the feedback information field of a UL_DCH from a UE receiving a DSCH in order to control the transmission power of the DSCH transmitted from a node B.

It is also a further object of the present invention to provide an apparatus and method for encoding a power offset to allow a UE receiving a DSCH to reliably transmit the power offset for use in controlling the transmission power of the DSCH.

It is still another object of the present invention to provide an apparatus and method for decoding a received power offset for power control of a DSCH in a node B.

It is yet another object of the present invention to provide an apparatus and method for directly transmitting a power control command in the feedback information field of a UL_DCH from a UE receiving a DSCH for power control of the DSCH.

It is also yet another object of the present invention to provide a method of determining a power control command for power control of a DSCH in the feedback information field of a UL_DCH in a UE receiving the DSCH by measuring the strengths of a CPICH and a dedicated pilot channel signal received from each node B in the active set of the UE.

The foregoing and other objects can be achieved by providing an apparatus and method for controlling the transmission power of a DSCH in a mobile communication system.

In the DSCH transmission power controlling method, a UE generates information for controlling the transmission power of the DSCH based on a channel condition determined by the reception power of a CPICH from a node B transmitting the DSCH to the UE, and then transmits the power control information to the node B.

In the DSCH transmission power controlling apparatus, a pilot channel strength measurer measures the strengths of CPICHs from node Bs transmitting TPCs on DL_DCHs to a UE. A CPICH strength change detector checks whether the strength of the CPICH signal from a node B transmitting a DSCH to the UE has been increased or decreased. An offset determiner determines an offset according to the check result received from the CPICH strength change detector, and a transmitter transmits the offset received from the offset determiner on a UL_DCH.

BRIEF DESCRIPTION OF THE DRAWINGS

The above and other objects, features and advantages of the present invention will become more apparent from the following detailed description when taken in conjunction with the accompanying drawings in which:

FIGS. 1A and 1B illustrate the structures of a DSCH and a DL_DCH, respectively;

FIGS. 5A and 5B respectively illustrate the structures of an FBI and a UL_DCH on which the FBI is transmitted.;

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 2:
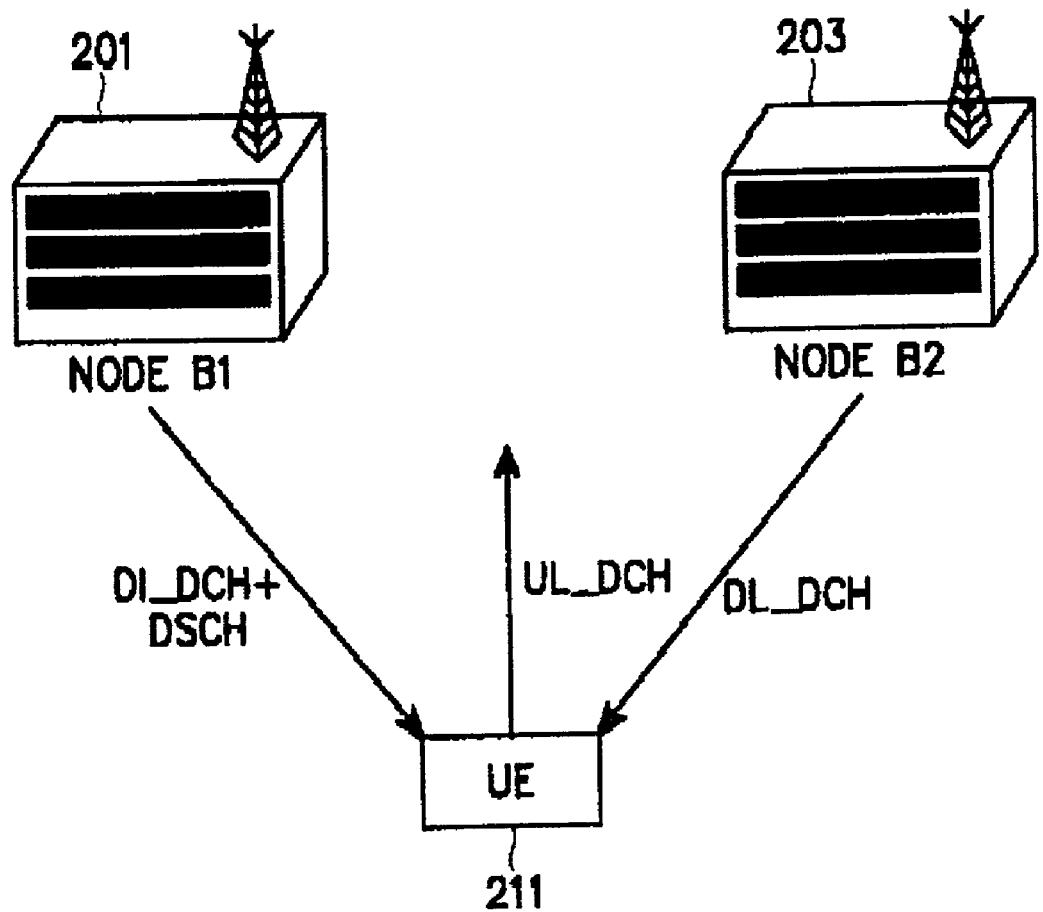
FIG. 2 illustrates the flow of uplink signals and downlink signals, referred to for describing the problems of DSCH power control in an SHO region.
Figure 3:
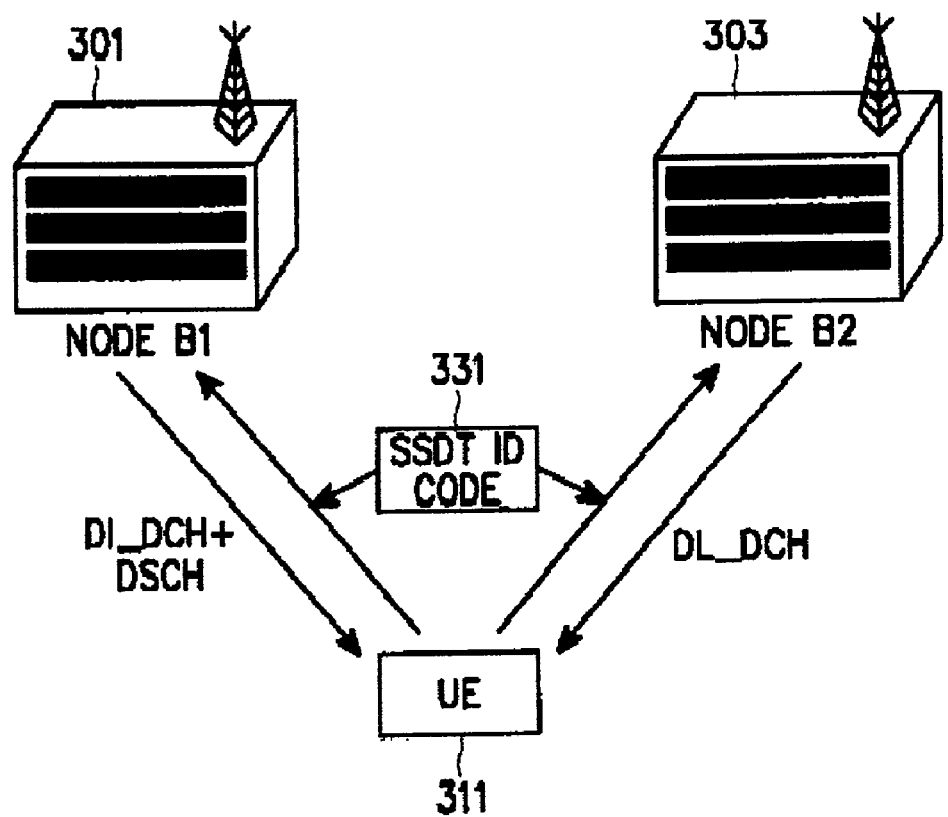
FIG. 3 illustrates the flow of uplink signals and downlink signals, referred to for describing the problems of SSDT-based DSCH power control in an SHO region.
Figure 4:
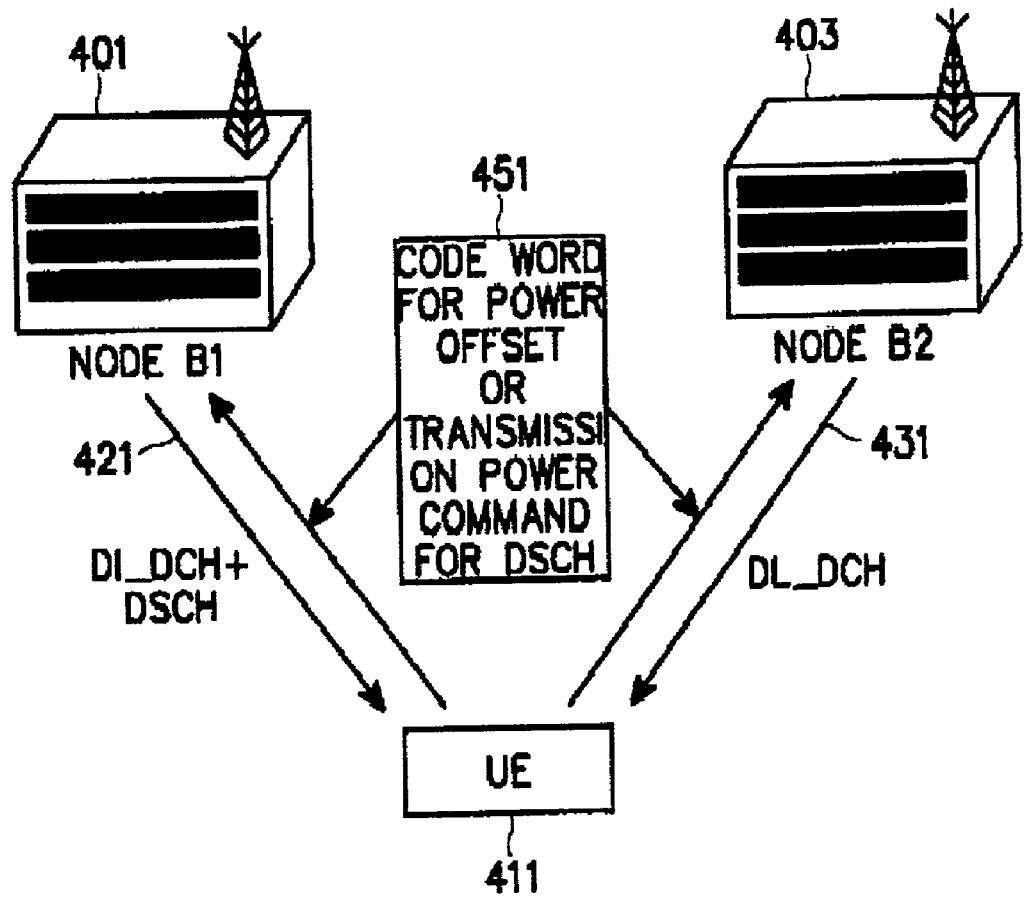
FIG. 4 illustrates the flow of uplink signals and downlink signals, referred to for describing DSCH power control in an SHO region according to the present invention.

FIG. 4 illustrates a system configuration with two node Bs set in an active set, by way of example, for better understanding of the present invention. In FIG. 4, node B1 401 transmits both a DL_DCH and a DSCH to a UE 411, and node B2 403 is newly admitted to the active set and transmits only a DL_DCH to the UE 411. The UE 411 broadcasts a UL_DCH to node B1 401 and node B2 403 indiscriminately. In the prior art, when the UE 411 enters an SHO region, the UE 411 receives CPICHs from node B1 401 and node B2 403 together and measures the signal strengths of the CPICHs to select a primary node B among the node Bs. The UE 411 transmits the temporary ID of a node B designated as a primary node B in the feedback information (FBI) field of a UL_DCH. The FBI is 2 bits in length as shown in FIG. 5A. Referring to FIG. 5A, reference numeral 501 denotes an S field of the FBI that the UE 411 transmits to a node B when transmission antenna diversity is employed in WCDMA. Reference numeral 503 denotes a D field of the FBI that the UE 411 transmits to the node B when SSDT is employed in WCDMA. The S field 501 is 0 or 1 bit. If the S field is 0 bit, this implies that the transmission antenna diversity is not used. The D field 503 is 0, 1, or 2 bits in length. This happens when the S field is 0 because the D field is selected in accordance with the S filed. If the D field 503 is 0 bit, this implies that the SSDT is not used. In the case of 1 bit, the SSDT is used together with the transmission antenna diversity, and in the case of 2 bits, only the SSDT is adopted. If the SSDT is used, the FBI field transmits a codeword representing the temporary ID of a primary node B. Table 1 and Table 2 below list SSDT codewords in use according to the present WCDMA standards, which vary depending on FBI length and the channel conditions of the node Bs in the active set of the UE 411. A code bit in parenthesis is omitted when the codeword cannot be transmitted completely in one frame because a DSCH radio frame includes 15 slots.

TABLE 1

| | ID code | | |
|---|---|---|---|
| ID label | Long code | Medium code | Short code |
| a | 000000000000000 | (0)0000000 | 00000 |
| b | 101010101010101 | (0)1010101 | 01001 |
| c | 011001100110011 | (0)0110011 | 11011 |
| d | 110011001100110 | (0)1100110 | 10010 |
| e | 000111100001111 | (0)0001111 | 00111 |
| f | 101101001011010 | (0)1011010 | 01110 |
| g | 011110000111100 | (0)0111100 | 11100 |
| h | 110100101101001 | (0)1101001 | 10101 |

Table 1 illustrates SSDT codewords when a 1-bit FBI is used, that is, SSDT is adopted together with transmission antenna diversity.

TABLE 2

| | ID code | | |
|---|---|---|---|
| ID label | Long code | Medium code | Short code |
| a | (0)0000000 | (0)000 | 000 |
|   | (0)0000000 | (0)000 | 000 |
| b | (0)0000000 | (0)000 | 000 |
|   | (1)1111111 | (0)111 | 111 |
| c | (0)1010101 | (0)101 | 101 |
|   | (0)1010101 | (0)101 | 101 |
| d | (0)1010101 | (0)101 | 101 |
|   | (1)0101010 | (1)010 | 010 |
| e | (0)0110011 | (0)011 | 011 |
|   | (0)0110011 | (0)011 | 011 |
| f | (0)0110011 | (0)011 | 011 |
|   | (1)1001100 | (1)100 | 100 |
| g | (0)1100110 | (0)110 | 110 |
|   | (0)1100110 | (0)110 | 110 |
| h | (0)1100110 | (0)110 | 110 |
|   | (1)0011001 | (1)001 | 001 |

Table 2 illustrates SSDT codewords when a 2-bit FBI is used, that is, SSDT is adopted alone.

In the prior art, Table 1 or Table 2 is selectively used according to a used mode and the codewords of Table 1 or Table 2 are assigned as temporary IDs to node Bs in the active set. A primary node B is re-designated at every predetermined period set by the higher layer and the UE 411 transmits the temporary ID of a primary node B to the node Bs in the active set. If a DSCH-transmitting node B is a primary node B, the node B determines the transmission power of a DSCH according to a TPC received from the UE 411. On the other hand, if the node B is a non-primary node B, it determines the transmission power of the DSCH according to a fixed power offset and the TPC received from the UE 411. A problem with the prior art is that the TPC transmitted from the UE 411 is not determined by a signal from the DSCH-transmitting node B only and thus application of the fixed power offset to the DSCH may result in overpower or underpower of the DSCH.

FIG. 5B illustrates the structure of an uplink dedicated physical control channel (UL_DPCCH) on which the UE 411 transmits the TPC. In FIG. 5B, reference numeral 511 denotes one UL_DPCCH frame on a UL_DCH, including Pilot 521, TFCI 522, FBI 523 and TPC 524 in each slot. The UL_D-PCCH structure varies with the lengths of Pilot 521, TFCI 522, FBI 523, and TPC 524. Pilot 521 is used for a node B to estimate the channel condition between the UE 411 and the node B and measure the signal strength from the UE 411. TFCI 522 transmits a TFCI codeword notifying transmission of transport channels with different data rates on an uplink dedicated physical data channel (UL_DPDCH). FBI 523 transmits feedback information about transmission antenna diversity and SSDT, and TPC 524 transmits a TPC that is determined by receiving signals from node Bs in the active set and determining whether the downlink signal power is high or low in the UE 411.

As seen in FIG. 5B, the UE 411 transmits one TPC on a UL_DPCCH regardless of the number of node Bs that receive the UL-DPCCH. Thus, the node Bs in the active set increase or decrease their transmission power indiscriminately based on TPC 524 received from the UE 411. The UE 411 also determines whether the downlink signal power is high or low by combining all received DL_DCHs. Accordingly, if the UE 411 receiving the DSCH enters the SHO region, it determines TPC 524 by combining the DL_DCH from the node B of interest, bound with the DSCH with DL_DCHs from the other node Bs in the active set although the former is the greatest in strength. Although there is no need for increasing the transmission power of the DL_DCH due to a good channel condition between the DSCH-transmitting node B and the UE 411, bad channel conditions between the UE 411 and other node Bs may lead to transmission of a TPC commanding transmission power-up from the UE 411 in some cases. Then, the DSCH-transmitting node B increases its transmission power according to TPC 524 from the UE 411, resulting in overpower of the DSCH. While the DSCH-transmitting node B applies a different fixed offset according to whether it is a primary node B or a non-primary node B to solve this problem, the same problem of overpower or underpower of the DSCH also arises from the use of the fixed power offsets.

In the present invention, SSDT codes shown in Table 1 and Table 2 or codes produced by a different encoding method are transmitted in correspondence with information about a relative power offset or the channel condition between a UE and the node Bs in the active set as estimated by the UE. Or a power control command only for the DSCH is directly transmitted in the S field 501 of the FBI shown in FIG. 5A. Returning to FIG. 4, the UE 411 measures the strengths of CPICHs and the dedicated pilots of DL_DCHs received from node B1 401 and node B2 403. Then the UE 411 transmits a relative power offset or a TPC command for power control of the DSCH to node B1 401 in the FBI field of a UL_DPCCH. Node B2 403 neglects the information of the FBI field because it is not related with node B2 403. Upon receipt of the relative power offset information or the TPC command for the DSCH only, node B1 401 determines the transmission power of the DSCH based on the received information. If the relative power offset information is transmitted by an SSDT codeword shown in Table 1 or Table 2, the transmission period varies with the length and type of the SSDT codeword. The transmission period is shortest when a 2-bit FBI is used. As seen from Table 2, a total of 6 bits are transmitted in three slots, 2 bits per slot for a short SSDT codeword. The transmission period is longest when a 1-bit FBI field is used. As seen from Table 1, a total of 15 bits are transmitted in 15 slots, i.e., in one frame, one bit per slot for a long SSDT codeword.

Figure 13:
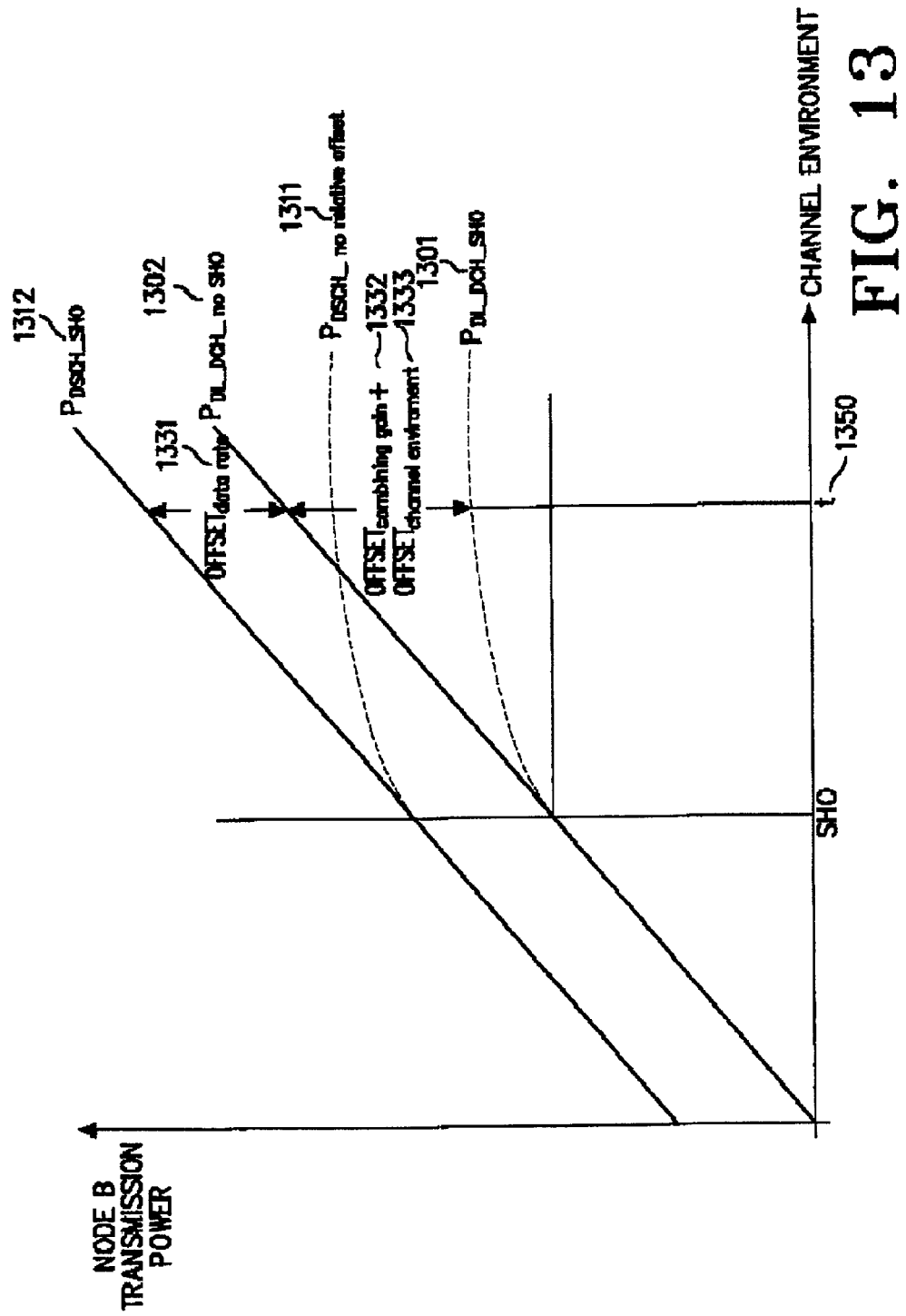
FIG. 13 is a graph showing the concept of offsets used according to an embodiment of the present invention.

A plurality of factors must be considered in determining a relative power offset according to the present invention. The factors are illustrated in FIG. 13, given as $$P_{DSCH_{SHO}} = P_{DL\_DCH_{SHO}} + \text{offset}_{data\ rate} + \text{offset}_{combining\ gain} + \text{offset}_{cahnnel\ environment} \quad (1)$$

The transmission power of the DSCH in the SHO region is calculated using Eq. (1). If the DSCH is assigned to the UE 411, the transmission power of the DSCH is determined considering the transmission power of a DL_DCH assigned together with the DSCH in the SHO region, a power offset according to a combining gain resulting from combining the DL_DCH with DL_DCHs received from the other node Bs in the active set in the SHO region, a power offset according to a change in the transmission power of the DL_DCH caused by a channel environmental change between the UE 411 and the DSCH-transmitting node B.

If the UE 411 is in a non-SHO region, the transmission power of the DSCH is determined by the transmission power of the DL_DCH, a power offset according to the data rates of the DSCH and the DL_DCH, and a power offset according to the change of the DL_DCH transmission power caused by a channel environmental change between the UE 411 and the DSCH-transmitting node B. The change of the DL_DCH transmission power is determined based on a TPC received at the node B from the UE 411.

Eq. (1) will be made clear in the following description referring to FIG. 13.

FIG. 13 is a graph showing changes in the transmission power of a DSCH-transmitting node B. Factors needed to determine the transmission power of the DSCH at time t indicated by reference numeral 1350 are also shown. A curve 1302 represents the transmission power of a DL_DCH to be transmitted from the node B when the UE is in a non-SHO region and a curve 1312 represents the transmission power of the DSCH when the UE is in an SHO region or when the UE is in a non-SHO region with a relative power offset given to the DSCH. A curve 1301 represents the transmission power of the DL_DCH from the node B that varies as the UE moves to the SHO region and a curve 1311 represents the transmission power of the DSCH without a relative power offset when the UE moves to the SHO region. Offset$_{data\ rate}$ 1331 is a power offset due to the difference between the data rates of the DSCH and the DL_DCH, applied from the start of the DSCH transmission and calculable at the node B. Offset$_{data\ rate}$ 1331 can be changed as the data rates of the DL_DCH and the DSCH change, ranging from 0 to 18 dB. Offset$_{combing\ gain}$ 1332 is a power offset according to the combining gain of DL_DCHs in the case where the UE is located in the SHO region, determined by the number of node Bs in the active set and the difference in reception power between the DL_DCHs received at the UE from the node Bs at time t. Offset$_{combing\ gain}$ 1332 usually ranges from 1 to 3 dB. Offset$_{channel\ environment}$ 1333 is a power offset given to the DL_DCH according to a channel environmental change between the UE and the DSCH-transmitting node B at time t. Offset$_{channel\ environment}$ 1333 is determined by interpreting the CPICH of the DSCH-transmitting node B or separately interpreting the dedicated pilot of the DL_DCH transmitted from the DSCH-transmitting node B to the UE. Offset$_{channel\ environment}$ 1333 depends mainly on the distance between the node B and the UE and is in inverse proportion to the $4^{th}$ power of the distance. If one node B exists in the active set, that is, the UE is located in a non-SHO region, there is no need for calculating Offset$_{channel\ environment}$ 1333 if the node B refers to a TPC transmitted from the UE. However, if two or more node Bs exist in the active set, Offset$_{channel\ environment}$ 1333 is calculated based on signal strength measurements in the UE because the DSCH-transmitting node B cannot utilize the received TPC in determining the transmission power of the DSCH.

The curve 1312 represents appropriate transmission power of the DSCH needed for the UE located in the SHO region and the present invention aims to allow the DSCH-transmitting node B to transmit the DSCH to the UE according to the curve 1312. If the UE moves to the SHO region without using a relative power offset as in the prior art, the node B transmits the DSCH to the UE according to the curve 1311. The curve 1311 is similar in shape to the curve 1301 representing the transmission power of the DL_DCH received at the UE in the SHO region. The curve 1302 representing the transmission power of the DL_DCH for a non-SHO region, if the UE moves to the SHO region, is changed to the curve 1301 due to soft combining.

The curve 1302 represents the DL_DCH transmission power reflecting the channel environmental change between the node B and the UE. This curve 1302 is used to determine the transmission power of the DSCH in a non-SHO region.

In accordance with the present invention, the UE calculates an appropriate relative power offset and transmits it to the node B so that the node B may use the DSCH transmission power curve 1312 according to the curve 1302. Since Offset$_{data\ rate}$ 1331 is determined by the difference between the data rates of the DSCH and the DL_DCH and known to the node B, the UE does not transmit Offset$_{data\ rate}$ 1331 to the node B. The UE determines a relative power offset considering only Offset$_{combining\ gain}$ 1332 and Offset$_{channel\ environment}$ 1333 and transmits the relative power offset in the FBI of a UL_DPCCH.

Offset$_{combining\ gain}$ 1332 is dependent on the reception power of DL_DCHs received from the node Bs in the active set and the number of the node Bs. The number of the node Bs is known to the UE and the reception power of an individual DL_DCH is also calculable in the UE. After the least and greatest values of a combining gain depending on the number of the node Bs in the active set are first determined, the reception power of the DL-DCH received from each node B in the active set is calculated. Thus Offset$_{combining\ gain}$ 1332 is produced. Suppose that two node Bs are in the active set, the combining gain of DL_DCHs from the two node Bs ranges 1 to 3 dB, and each DL_DCH reception power is identical. Then Offset$_{combining\ gain}$ 1332 has the greatest value, 3 dB.

Offset$_{channel\ environment}$ 1333 is determined according to the channel environment between the UE and the DSCH-transmitting node B. The channel environment is determined according to the distance between the UE and the DSCH-transmitting node B, multi-path fading, etc. Offset$_{channel\ environment}$ 1333 can be determined in many ways: using a CPICH signal received at the UE, using the dedicated pilot channel signal of a DL_DCH received at the UE, and using both the methods.

In the first channel environment determining method, the UE is supposed to measure the strengths of all CPICH signals received from the node Bs in the active set on a frame basis and reports them to a UTRAN in accordance with the present WCDMA standards. The UTRAN determines a power offset for the DSCH by comparing the CPICH signal from the DSCH-transmitting node B with the CPICH signals from the other node Bs. More specifically, the UE measures the strength of a CPICH signal from the DSCH-transmitting node B in every frame. If the signal strength increases, Offset$_{channel\ environment}$ 1333 is decreased, and vice versa. The initial value of Offset$_{channel\ environment}$ 1333 can be determined based on the CPICH signal strength measured when the UE enters the SHO region. The initial value can be set to 0 dB. While the UE stays in the SHO region, Offset$_{channel\ environment}$ 1333 varies with the signal strength of the CPICH measured at a frame level. For example, if the present CPICH signal strength is different from the CPICH signal strength measured one frame earlier by 1 dB, Offset$_{channel\ environment}$ 1333 is set to 1 or 0.5 dB, or any other value. Offset$_{channel\ environment}$ 1333 has a different value for a different SHO region, largely classified into a downtown area, a secondary city center area, and a suburban area. Regarding one of the factors determining Offset$_{channel\ environment}$ 1333, the distance between the UE and the DSCH-transmitting node B, the CPICH signal strength is inversely proportional to the $4^{th}$ or $5^{th}$ power of the distance in the downtown area, to the $3^{rd}$ power of the distance in the secondary city center, and to the square of the distance in the suburban area. The CPICH signal strength measurement from another node B in the active set can be utilized in determining Offset$_{channel\ environment}$ 1333 to increase accuracy in this method. The difference between two CPICH signal strengths is defined as the difference between the CPICH signal strength of the DSCH-transmitting node B and the greatest of CPICH signal strengths of the other node Bs in the active set.

An example of determining Offset$_{channel\ environment}$ 1333 using the CPICH signal strength difference can be found in Table 3 below.

TABLE 3

| Decrement/increment in CPICH signal strength difference | Change in CPICH from DSCH-transmitting node B | Offset according to channel environmental change between UE and DSCH-transmitting node B |
|---|---|---|
| + | Present | Offset increased from the previous offset |
|   | Absent | The same offset |
| − | Present | Offset decreased from the previous offset |
|   | Absent | The same offset |

Table 3 illustrates an Offset$_{channel\ environment}$ determining method using a CPICH signal strength difference. The increase of the present CPICH signal strength difference from the previous one implies that the UE becomes remote from the DSCH-transmitting node B or the CPICH signal strength of another node B in the active set, measured by the UE, is changed. If the CPICH signal strength of the DSCH-transmitting node B is decreased, the UE uses an offset larger than Offset$_{channel\ environment}$ 1333 for the previous frame. If the CPICH signal strength is not changed, it implies that the CPICH signal strength of the non-DSCH transmitting node B has been changed. This has nothing to do with setting the DSCH transmission power and thus Offset$_{channel\ environment}$ 1333 for the previous frame is still applied.

In the above method, the initial value of Offset$_{channel\ environment}$ 1333 can be a value measured when the UE initially enters the SHO region. In this case, it can be set to 0 dB.

According to the second method of determining Offset$_{channel\ environment}$ 1333, the dedicated pilot signal strength of a DL_DCH received at the UE is used.

Since a signal measuring period is one frame in the first method, it may have limitations in effective adaptation to rapid channel environmental changes. The dedicated pilot signal strength of a DL_DCH is measured when there is a need for rapidly reflecting channel environmental changes and the updating period of an SSDT code is short. This procedure is performed in the same manner as in the first method. That is, when the dedicated pilot signal strength of the DL_DCH from the DSCH-transmitting node B increases, an offset less than Offset$_{channel\ environment}$ 1333 for the previous frame is applied. If it is decreased, an offset larger than Offset$_{channel\ environment}$ 1333 for the previous frame is applied. To increase reliability, the dedicated pilot signal strength of a DL_DCH received from another node B in the active set can be utilized in the same manner as in the first method.

The third Offset$_{channel\ environment}$ 1333 determining method relies on the use of the above two methods. The first method is suitable for the case of less channel environmental change and a long SSDT updating period and the second method is suitable for the case of great channel environmental change and a short SSDT updating period. The third method is designed to take the advantages of the two methods in combination.

To help understanding of the third method, it is assumed that an SSDT code is 10 bits, the D field of an FBI is 2 bits, and a relative power offset update period is 5 slots . The UE measures the signal strength of a DL_DCH in each of the 5 slots. The UE calculates Offset$_{channel\ environment}$ 1333 by applying the highest weight to the latest measurement and then calculates a relative power offset. The UE transmits the relative power offset to the node B that transmits the DSCH over the next 5 slots. After transmitting the relative power offset twice, the UE determines a new relative power offset with Offset$_{channel\ environment}$ 1333 determined based on a CPICH signal strength and transmits the relative power offset to the DSCH-transmitting node B. The purpose of this operation is to compensate the relative power offset in case the real channel environment is not fully reflected because the number of dedicated pilot bits on the DL_DCH is less than that of the CPICH.

The power offset compensating period using the CPICH can be set by agreement between the UE and the higher layer of the node B.

The real offset value transmitted from the UE to the DSCH-transmitting node B for use in determining a relative power offset for the DSCH is the sum of Offset$_{combining\ gain}$ 1332 and Offset$_{channel\ environment}$ 1333. If the sum is defined as a DSCH transmission power offset for setting the DSCH transmission power, the DSCH transmission power offset is given as

TABLE 4

| DSCH transmission power offset (dB) | Short code |
|---|---|
| 0.5 | 00000 |
| 1 | 01001 |
| 1.5 | 11011 |
| 2 | 10010 |
| 2.5 | 00111 |
| 3 | 01110 |
| 3.5 | 11100 |
| 4 | 10101 |

Table 4 lists DSCH transmission power offsets for short SSDT codes in a 1-bit FBI. The DSCH transmission offsets are determined taking into account a combining gain-related offset ranging between 1 and 3 dB and a channel environment change-related offset. After the sum of Offset$_{combining\ gain}$ 1332 and Offset$_{channel\ environment}$ 1333 is rounded off, the nearest value is selected among the eight offsets shown in Table 4.

The node B can use the DSCH transmission power offset for a DSCH transmission power updating period. After using the DSCH transmission power offset as an initial value in transmitting a first DSCH slot, the node B may control the DSCH transmission power from the next slot based on a TPC received from the UE.

The relative power offset for use in determining the DSCH transmission power can be transmitted by different codes other than the conventional SSDT codes, such as (n, 3) codes and (n, 4) codes.

For a (n, 3) code, 3 indicates the number of input information bits representing a relative power offset and n indicates the length of a code. The (n, 3) code is a block code with which a relative power offset can be controlled in 8 levels and n can be adjusted according to channel condition, FBI length and a relative power offset period. A (n, 3) code becomes a block code showing an optimal performance all the time for length n.

There will be given a detailed description of a (n, 3) code generation method for transmitting a relative power offset.

Figure 14:
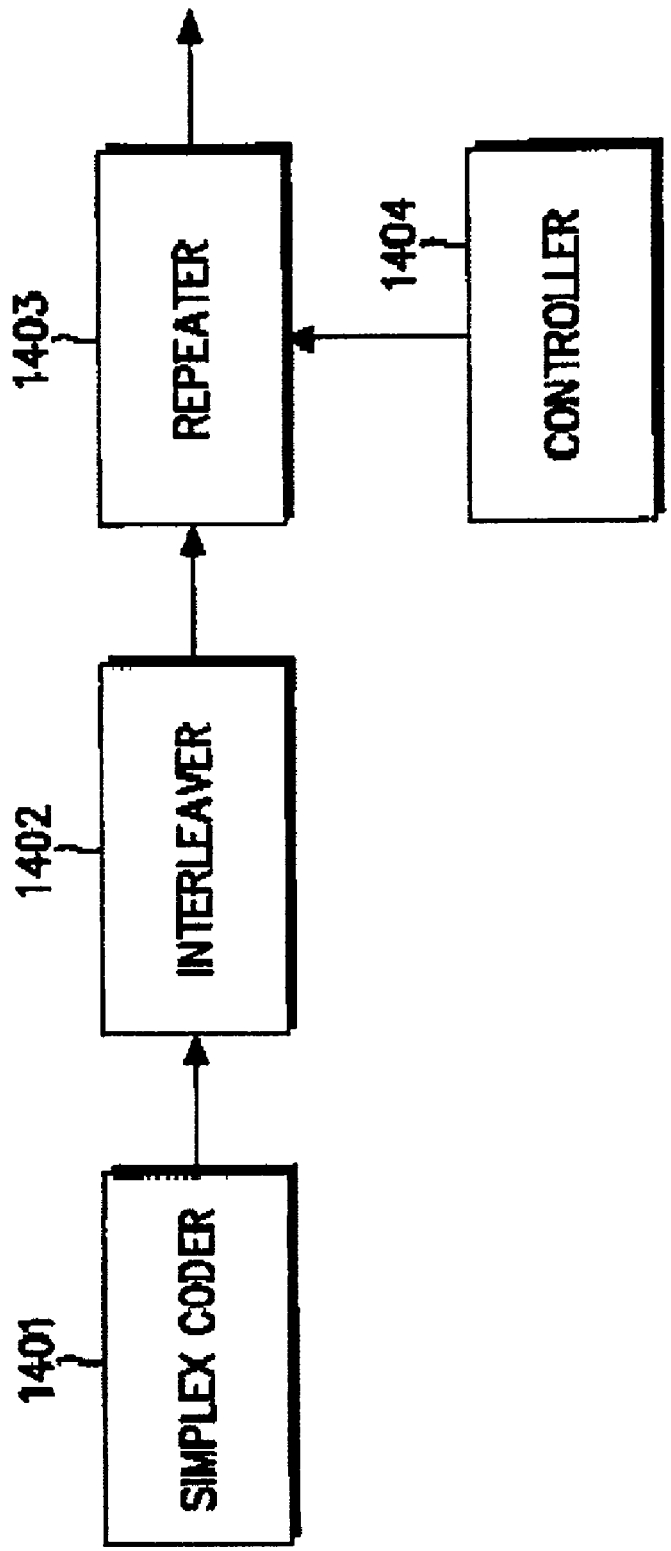
FIG. 14 is a block diagram of an encoding device for generating a (n, 3) code and a (n, 4) code according to an embodiment of the present invention.

FIG. 14 is a block diagram of an encoder for generating a (n, 3) code and a (n, 4) code according to the present invention.

A simplex coder 1401 generates a simplex codeword. The simplex codeword is produced by puncturing the first column of a (m×m) first-order Reed-Muller code. ($2^{k-1}$, k) simplex codewords are generated from ($2^k$, k) first-order Reed-Muller codes. To generate (n, 3) codes, (7, 3) simplex codewords are required. Table 5 below lists (8, 3) first-order Reed-Muller codes and (7, 3) simplex codewords produced by puncturing the first column, i.e., code symbols of the first-order Reed-Muller codes.

TABLE 5

| W0 | 0 | 0 | 0 | 0 | 0 | 0 | 0 | 0 |
|---|---|---|---|---|---|---|---|---|
| W1 | 0 | 1 | 0 | 1 | 0 | 1 | 0 | 1 |
| W2 | 0 | 0 | 1 | 1 | 0 | 0 | 1 | 1 |
| W3 | 0 | 1 | 1 | 0 | 0 | 1 | 1 | 0 |
| W4 | 0 | 0 | 0 | 0 | 1 | 1 | 1 | 1 |
| W5 | 0 | 1 | 0 | 1 | 1 | 0 | 1 | 0 |
| W6 | 0 | 0 | 1 | 1 | 1 | 1 | 0 | 0 |
| W7 | 0 | 1 | 1 | 0 | 1 | 0 | 0 | 1 |

The simplex coder 1401 that generates simplex codewords from first-order Reed-Muller codes, as seen from Table 5, will be described with reference to FIG. 16. The simplex coder shown in FIG. 16 may be replaced with a memory storing the information contained in Table 5.

Figure 16:
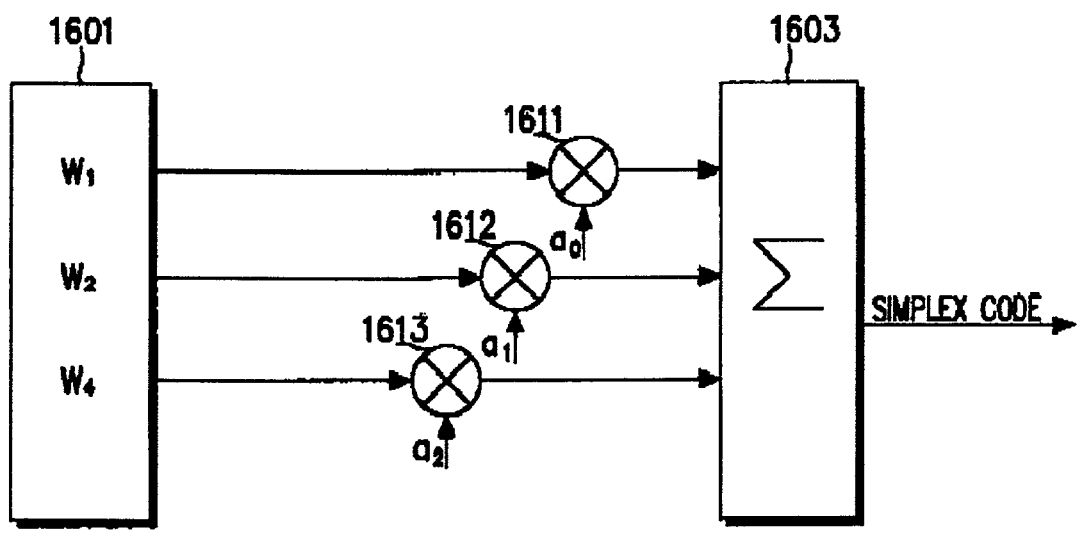
FIG. 16 is a block diagram of a simplex coder for generating a (7, 3) code according to an embodiment of the present invention.

FIG. 16 is a block diagram of the simplex coder for generating (7, 3) simplex codes according to the present invention.

In FIG. 16, a first-order Reed-Muller basis code generator 1601 generates first-order Reed-Muller basis codes W1, W2 and W4 for use in generating the first-order Reed-Muller codes W0 to W7. The leftmost code bits "0s" of the codes W1, W2 and W4 are punctured. The reason for using the punctured first-order Reed-Muller codes is to facilitate generation of simplex codewords. Multipliers 1611, 1612 and 1613 function to select some of the punctured first-order Reed-Muller basis codes necessary for generating a punctured code W$_j$ (j=0, 1, ..., 7) by multiplying input information bits (a$_0$, a$_1$, a$_2$) by the codes W1, W2 and W4 with the leftmost code bits punctured.

For example, if the information bits (a$_2$, a$_1$, a$_0$) are binary bits "101", the multipliers 1611, 1612 and 1613 select W4 and W1 among the punctured first-order Reed-Muller basis codes to generate W5 corresponding to a decimal number "5" indicated by the input information bits. A summer 1605 generates a first-order Reed Muller code corresponding to the input information bits by summing the selected first-order Reed-Muller basis codes.

Referring again to FIG. 14, The simplex coder 1401 outputs the (7, 3) simplex codeword to an interleaver 1402. The interleaver 1402 permutates the (7, 3) simplex codeword by columns according to a predetermined interleaving pattern. By the column permutation, the (7, 3) simplex codeword takes a particular form that makes the resulting code optimal for length n despite repetition of n code symbols. That is, the (7, 3) simplex codeword is converted to an optimal codeword by the column permutation.

To generate a (n, 3) code, the column permutation is carried out as follows.

$$[S_1, S_2, S_3, S_4, S_5, S_6, S_7] \rightarrow [S_1, S_2, S_4, S_7 S_3, S_5, S_6] \quad (2)$$

where S$_j$ (j=1, 2, ..., 7) represents the j$^{th}$ symbol of the (7, 3) simplex code. The permutated, i.e., reordered simplex code shows optimal performance for length n even though it is split by length n. The column permutation is the process of reordering an input simplex code to have an optimal weight distribution for length n.

The column-permutated simplex code is applied to the input of a repeater 1403. The repeater 1403 repeats the column-permutated (7, 3) simplex code under the control of the controller 1404. The controller 1404 controls the repeater 1403 to output n simplex code symbols which are repeated according to n.

For better understanding of the operations of the repeater 1403 and the controller 1404, generation of a (10, 3) code from a (7, 3) simplex code will be described by way of example.

The repeater 1403 repeats the column-permutated (7, 3) simplex code in the order of $S_1, S_2, S_4, S_7, S_3, S_5, S_6, S_1, S_2, S_4, S_7, S_3, S_5, S_6$ . . . and the controller 1404 controls the repeater 1403 to output only $S_1, S_2, S_4, S_7, S_3, S_4, S_6, S_1, S_2, S_4$ for n=10.

Figure 15:
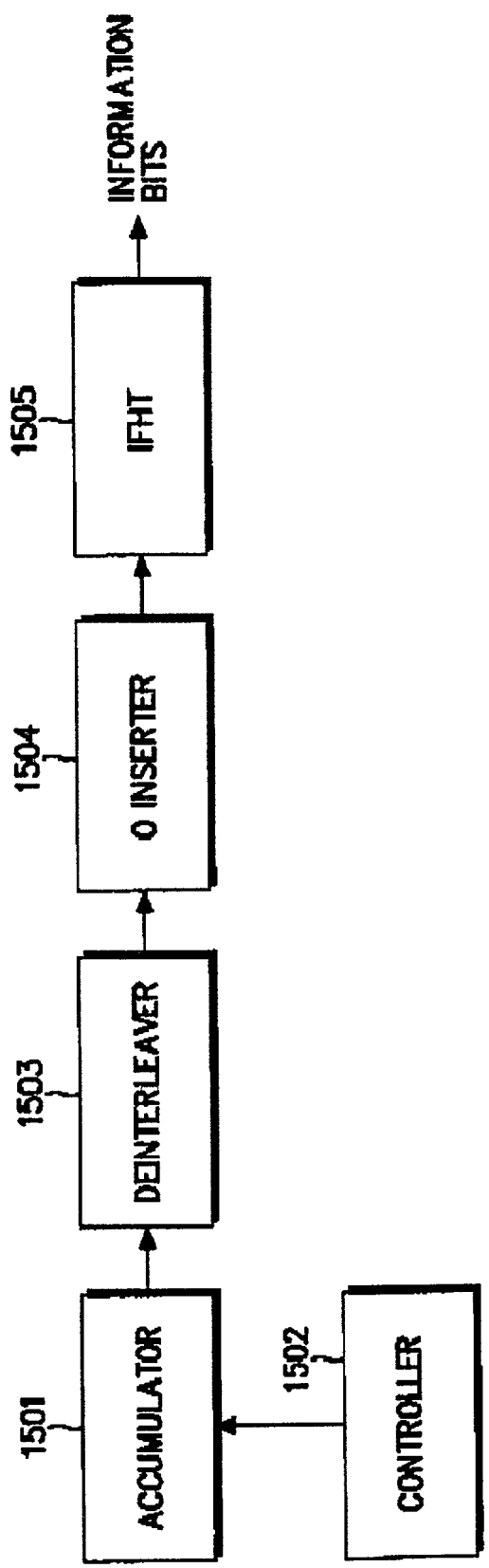
FIG. 15 is a block diagram of a decoding device for decoding a (n, 3) code and a (n, 4) code according to an embodiment of the present invention.

FIG. 15 is a block diagram of a decoding apparatus for decoding a (n, 3) code and a (n, 4) code according to the present invention.

controlled in 16 levels and n can be adjusted according to channel condition, FBI length and a relative power offset period. A (n, 4) code becomes a block code showing an optimal performance all the time for length n.

Now a description will be made of generation of a (n, 4) code referring to FIG. 14.

The simplex coder 1401 generates a simplex codeword. The simplex codeword is produced from a (m×m) first-order Reed-Muller code by puncturing the first column. A $(2^{k-1}, k)$ simplex code is generated from a $(2^k, k)$ first-order Reed-Muller code. For n mod 15=5, (n, 4) codes have a minimum distance different from that of optimal codes of length n by 1. Except the case where n mod 15=5 (i.e., n=5, 20, 35, 50, . . . ), (n, 4) codes show optimal performance for length n.

TABLE 6

(16, 4) first-order Reed-Muller codes and (15, 4) simplex codes

| | | | | | | | | | | | | | | | | |
|---|---|---|---|---|---|---|---|---|---|---|---|---|---|---|---|---|
| W0  | 0 | 0 | 0 | 0 | 0 | 0 | 0 | 0 | 0 | 0 | 0 | 0 | 0 | 0 | 0 | 0 |
| W1  | 0 | 1 | 0 | 1 | 0 | 1 | 0 | 1 | 0 | 1 | 0 | 1 | 0 | 1 | 0 | 1 |
| W2  | 0 | 0 | 1 | 1 | 0 | 0 | 1 | 1 | 0 | 0 | 1 | 1 | 0 | 0 | 1 | 1 |
| W3  | 0 | 1 | 1 | 0 | 0 | 1 | 1 | 0 | 0 | 1 | 1 | 0 | 0 | 1 | 1 | 0 |
| W4  | 0 | 0 | 0 | 0 | 1 | 1 | 1 | 1 | 0 | 0 | 0 | 0 | 1 | 1 | 1 | 1 |
| W5  | 0 | 1 | 0 | 1 | 1 | 0 | 1 | 0 | 0 | 1 | 0 | 1 | 1 | 0 | 1 | 0 |
| W6  | 0 | 0 | 1 | 1 | 1 | 1 | 0 | 0 | 0 | 0 | 1 | 1 | 1 | 1 | 0 | 0 |
| W7  | 0 | 1 | 1 | 0 | 1 | 0 | 0 | 1 | 0 | 1 | 1 | 0 | 1 | 0 | 0 | 1 |
| W8  | 0 | 0 | 0 | 0 | 0 | 0 | 0 | 0 | 1 | 1 | 1 | 1 | 1 | 1 | 1 | 1 |
| W9  | 0 | 1 | 0 | 1 | 0 | 1 | 0 | 1 | 1 | 0 | 1 | 0 | 1 | 0 | 1 | 0 |
| W10 | 0 | 0 | 1 | 1 | 0 | 0 | 1 | 1 | 1 | 1 | 0 | 0 | 1 | 1 | 0 | 0 |
| W11 | 0 | 1 | 1 | 0 | 0 | 1 | 1 | 0 | 1 | 0 | 0 | 1 | 1 | 0 | 0 | 1 |
| W12 | 0 | 0 | 0 | 0 | 1 | 1 | 1 | 1 | 1 | 1 | 1 | 1 | 0 | 0 | 0 | 0 |
| W13 | 0 | 1 | 0 | 1 | 1 | 0 | 1 | 0 | 1 | 0 | 1 | 0 | 0 | 1 | 0 | 1 |
| W14 | 0 | 0 | 1 | 1 | 1 | 1 | 0 | 0 | 1 | 1 | 0 | 0 | 0 | 0 | 1 | 1 |
| W15 | 0 | 1 | 1 | 0 | 1 | 0 | 0 | 1 | 1 | 0 | 1 | 0 | 0 | 1 | 1 | 0 |

Referring to FIG. 15, a (n, 3) code output from the repeater 1403 shown in FIG. 14 is applied to the input of an accumulator 1501. The accumulator 1501 operates under the control of a controller 1502. If a code received from the encoder is a (n, 3) code, the controller 1502 controls the accumulator 1501 to split the (n, 3) code symbols on a seven-symbol basis and accumulate the repeated symbols. The accumulator 1501 converts the accumulated (n, 3) code to a (7, 3) simplex code. A deinterleaver 1503 recovers the (7, 3) simplex code in the original code symbol order by permuting the (7, 3) simplex code by columns reversely according to the deinterleaving pattern of $$[S_1, S_2, S_4, S_7, S_3, S_5, S_6] \rightarrow [S_1, S_2, S_3, S_4, S_5, S_6, S_7] \quad (3)$$

The recovered (7, 3) simplex code is fed to a zero inserter 1504. The zero inserter 1504 converts the reverse-column-permutated (7, 3) simplex code to a (8, 3) first-order Reed-Muller code by inserting 0 before the leftmost code symbol of the (7, 3) simplex code received from the deinterleaver 1503.

An inverse fast Hadamard Transformer (IFHT) 1505 decodes the (8, 3) first-order Reed-Muller code to the input information bits $(a_0, a_1, a_2)$ through inverse fast Hadamard transformation of the (8, 3) first-order Reed-Muller code. The inverse fast Hadamard transformation has the advantages of fast decoding of a first-order Reed-Muller code and reduced complexity of a decoding hardware structure for the first-order Reed-Muller code.

In the relative offset transmitting method using a (n, 4) code, 4 is the number of input information bits representing a relative power offset and n is the length of a code. The (n, 4) code is a block code with which a relative power offset can be The simplex coder 1401 that generates simplex codewords from first-order Reed-Muller codes, as seen from Table 6, will be described with reference to FIG. 17. While a simplex coder for generating (15, 4) simplex codes is separately provided in the present invention for illustrative purposes, the simplex coder may be replaced with a memory that stores the (15, 4) simplex codes shown in Table 6.

Figure 17:
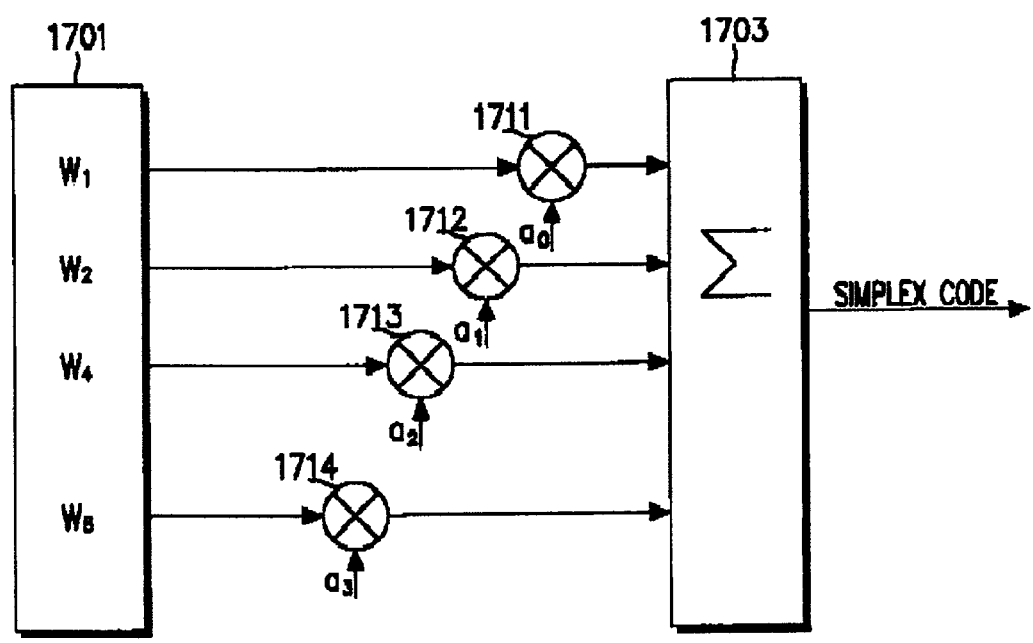
FIG. 17 is a block diagram of a simplex coder for generating a (15, 4) code according to an embodiment of the present invention.

FIG. 17 is a block diagram of the simplex coder for generating (15, 4) simplex codes according to the present invention.

A first-order Reed-Muller basis code generator 1701 generates first-order Reed-Muller basis codes W1, W2, W4 and W8 for use in generating the first-order Reed-Muller codes W0 to W15. The leftmost code bits "0s" of the codes W1, W2, W4 and W8 are punctured. The reason for using the punctured first-order Reed-Muller codes is to facilitate generation of simplex codewords. Multipliers 1711 to 1714 multiply input information bits $(a_0, a_1, a_2, a_3)$ by the codes W1, W2, W4 and W8 with the leftmost code bits punctured to select some of the punctured first-order Reed-Muller basis codes necessary for generating a punctured code $W_j$ (j=0, 1, . . . , 15). For example, if the information bits $(a_3, a_2, a_1, a_0)$ are binary bits "1001", the multipliers 1711 to 1714 select W8 and W1 among the punctured first-order Reed-Muller basis codes to generate W9 corresponding to a decimal number "9" indicated by the input information bits. A summer 1705 generates a first-order Reed Muller code corresponding to the input information bits by summing the selected first-order Reed-Muller basis codes.

Returning again to FIG. 14, the simplex coder 1401 outputs the (15, 4) simplex codeword to the interleaver 1402. The interleaver 1402 permutates the (15, 4) simplex codeword by columns. By the column permutation, the (15, 4) simplex codeword takes a particular form that makes the resulting code optimal for length n despite repetition of n code symbols.

The interleaver 1402 carries out column permutation on the (n, 4) simplex codeword according to the interleaving pattern of $$[S_1, S_2, S_3, S_4, S_5, S_6, S_7, S_8, S_9, S_{10}, S_{11}, S_{12}, S_{13}, S_{14}, S_{15}] \rightarrow [S_1, S_2, S_4, S_8, S_{14}, S_{13}, S_{11}, S_7, S_5, S_3, S_{12}, S_{10}, S_{15}, S_9, S_6] \quad (4)$$

Except the case where n mod 15=5 (i.e., n=5, 20, 35, 50, ... ), (n, 4) codes with optimal performance for n can be generated by column permutation. For n mod 15=5, (n, 4) codes are generated, which have a minimum distance different from that of the optimal codes of length n by 1.

The column-permutated simplex code is applied to the input of the repeater 1403. The repeater 1403 repeats the column-permutated (15, 4) simplex code under the control of the controller 1404. The controller 1404 controls the repeater 1403 to output n simplex code symbols which are repeated according to n.

For better understanding of the operations of the repeater 1403 and the controller 1404 concerning the (n, 4) code, generation of a (20, 4) code from a (15, 4) simplex code will be described by way of example. The repeater 1403 repeats the column-permutated (15, 4) simplex code in the order of $S_1, S_2, S_4, S_8, S_{14}, S_{13}, S_{11}, S_7, S_5, S_3, S_{12}, S_{10}, S_{15}, S_9, S_6, S_1, S_2, S_4, S_8, S_{14}, S_{13}, S_{11}, S_7, S_5, S_3, S_{12}, S_{10}, S_{15}, S_9, S_6$ ... and the controller 1404 controls the repeater 1403 to output only $S_1, S_2, S_4, S_8, S_{14}, S_{13}, S_{11}, S_7, S_5, S_3, S_{12}, S_{10}, S_{15}, S_9, S_6, S_1, S_2, S_4, S_8, S_{14}$ for n=20.

With reference to FIG. 15, decoding the (n, 4) code will be described below.

In operation, a (n, 4) code output from the repeater 1404 shown in FIG. 14 is applied to the input of the accumulator 1501. The accumulator 1501 operates under the control of a controller 1502. The controller 1502 controls the accumulator 1501 to split the (n, 4) code symbols on a 15-symbol basis and accumulate the repeated symbols. The accumulator 1501 converts the accumulated (n, 4) code to a (15, 4) simplex code. The deinterleaver 1503 recovers the (15, 4) simplex code in the original code symbol order by permuting the (15, 4) simplex code by columns reversely according to the deinterleaving pattern of $$[S_1, S_2, S_4, S_8, S_{14}, S_{13}, S_{11}, S_7, S_5, S_3, S_{12}, S_{10}, S_{15}, S_9, S_6] \rightarrow [S_1, S_2, S_3, S_4, S_5, S_6, S_7, S_8, S_9, S_{10}, S_{11}, S_{12}, S_{13}, S_{14}, S_{15}] \quad (5)$$

The recovered (15, 4) simplex code is output to the zero inserter 1504. The zero inserter 1504 converts the reverse-column-permutated (15, 4) simplex code to a first-order Reed-Muller code by inserting 0 before the leftmost code symbol of the (15, 4) simplex code received from the deinterleaver 1503. The inverse fast Hadamard Transformer 1505 decodes the (16, 4) first-order Reed-Muller code to the input information bits ($a_0, a_1, a_2, a_3$,) through inverse fast Hadamard transformation of the (16, 4) first-order Reed-Muller code. The inverse fast Hadamard transformation has the advantages of fast decoding of a first-order Reed-Muller code and reducing complexity of a decoding hardware structure for the first-order Reed-Muller code.

Now, a simplex coder for generating both a (n, 4) simplex code and a (n, 3) simplex code according to the present invention will be described below. The (n, 3) code and the (n, 4) code are applicable to relative power offset levels for the transmission power of the DSCH directed to the UE. The (n, 3) code is used if it is allowed that the number of relative power offset levels is small and the (n, 4) code is used if many relative power offset levels must be set. Which code will be used is determined based on several criteria. One of the criteria is the number of node Bs in the active set when the UE is located in the SHO region. The (n, 3) code is used when a small number of node Bs exist in the active set and the (n, 4) code is selected when a large number of node Bs belong to the active set.

Referring to FIG. 14, the simplex coder 1401 generates a simplex codeword. The simplex codeword is produced from a (m×m) first-order Reed-Muller code by puncturing the first column. From a ($2^k$, k) first-order Reed-Muller code is generated a ($2^{k-1}$, k) simplex codeword. A (7, 3) simplex code and a (15, 4) simplex code are required to generate a (n, 3) code and a (n, 4) code, respectively. Table 5 used for the (n, 3) encoder illustrates (8, 3) first-order Reed-Muller codes is also applied to the encoder capable of generating both the (n, 3) code and the (n, 4) code. (7, 3) simplex codewords are produced by puncturing the first column in Table 5.

Table 6 used for the (n, 4) encoder illustrates (15, 3) first-order Reed-Muller codes is also applied to the encoder capable of generating both the (n, 3) code and the (n, 4) code. (15, 4) simplex codewords are produced by puncturing the first column in Table 6.

Figure 18:
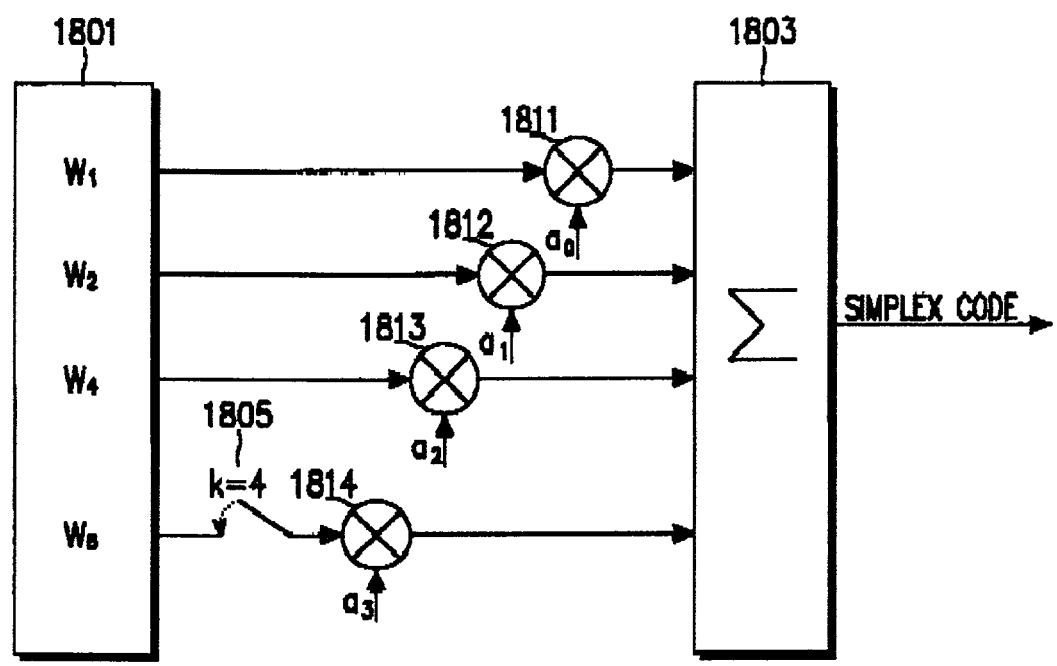
FIG. 18 is a block diagram of a simplex coder for generating a (15, 4) code and a (7, 3) code according to an embodiment of the present invention.

The encoder for generating the simplex codes from the first-order Reed-Muller codes shown in Table 5 and Table 6 are illustrated in FIG. 18. While the encoder is separately provided in FIG. 18, a memory storing the information contained in Table 5 and Table 6 can be used instead.

Referring to FIG. 18, a first-order Reed-Muller basis code generator 1801 generates first-order Reed-Muller basis codes W1, W2, W4 and W8 for use in generating the first-order Reed-Muller codes W0 to W15. The leftmost code bits "0s" of the codes W1, W2, W4 and W8 are punctured. The reason for using the punctured first-order Reed-Muller codes is to facilitate generation of simplex codewords. W8 is additionally used in the (n, 3) code generator to generate a (n, 4) code. Multipliers 1811 to 1814 multiply input information bits ($a_0, a_1, a_2, a_3$) by the codes W1, W2, W4 and W8 with the leftmost code bits punctured to select some of the punctured first-order Reed-Muller basis codes necessary for generating a punctured code $W_j$ (j=0, 1, . . . , 15).

For example, if the information bits ($a_3, a_2, a_1, a_0$) are binary bits "1101", the multipliers 1811 to 1814 select W8, W4 and W1 among the punctured first-order Reed-Muller basis codes to generate W13 corresponding to a decimal number "13" indicated by the input information bits. A switch 1803 is used to generate only the (n, 4) code. That is, the switch 1803 is open when the (n, 3) code is generated. A summer 1805 generates a first-order Reed Muller code corresponding to the input information bits by summing the selected first-order Reed-Muller basis codes.

Referring again to FIG. 14, the simplex code is applied to the input of the interleaver 1402. The interleaver 1402 permutates the simplex code by columns according to a specific interleaving pattern. By the column permutation, the simplex codeword takes a particular form that makes the resulting code optimal for length n despite repetition of n code symbols. To generate the (n, 3) code, the column permutation is carried out in the interleaver 1402 according to the interleaving pattern of $$[S_1, S_2, S_3, S_4, S_5, S_6, S_7] \rightarrow [S_1, S_2, S_4, S_7, S_3, S_5, S_6] \quad (6)$$

The column permutation is the process of reordering an input simplex code according to a weight distribution. The permutated, i.e., reordered simplex code shows optimal performance for length n even though it is split by length n. To generate a (n, 4) code, the interleaver 102 carries out column permutation according to the interleaving pattern of $$[S_1, S_2, S_3, S_4, S_5, S_6, S_7, S_8, S_9, S_{10}, S_{11}, S_{12}, S_{13}, S_{14}, S_{15}] \to [S_1, S_2, S_4, S_8, S_{14}, S_{13}, S_{11}, S_7, S_5, S_3, S_{12}, S_{10}, S_{15}, S_9, S_6] \quad (7)$$

Except the case where n mod 15=5 (i.e., n=5, 20, 35, 50, ... ), to generate the (n, 4) codes with optimal performance for n can be generated by column permutation. For n mod 15=5, (n, 4) codes are generated, which have a minimum distance different from that of the optimal codes of length n by 1.

The column-permutated (7, 3) or (15, 4) simplex code is applied to the input of the repeater 1403. The repeater 1403 repeats the column-permutated (7, 3) or (15, 4) simplex code under the control of the controller 1404. The controller 1404 controls the repeater 1403 to output n simplex code symbols which are repeated according to n.

For better understanding of the operations of the repeater 1403 and the controller 1404, generation of a (15, 3) code from the column-permutated (7, 3) code will be described by way of example. The repeater 1403 repeats the column-permutated (7, 3) simplex code in the order of $S_1, S_2, S_4, S_7, S_3, S_5, S_6, S_1, S_2, S_4, S_7, S_3, S_5, S_6, \ldots$ and the controller 1404 controls the repeater 103 to output only $S_1, S_2, S_4, S_7, S_3, S_5, S_6, S_1, S_2, S_4, S_7, S_3, S_5, S_6, S_1$ for n=15.

The (n, 3) code and the (n, 4) code generated from the encoder are applied to the input of the decoding apparatus. The decoding operation will be described below.

In operation, a (n, 3) code or a (n, 4) code output from the repeater 1403 shown in FIG. 14 is applied to the input of the accumulator 1501. The accumulator 1501 operates under the control of the controller 1502. The controller 1502 determines which code is used between the (n, 3) code and (n, 4) code. In the case of the (n, 3) code, the controller 1502 controls the accumulator 1501 to split the (n, 3) code symbols on a seven-symbol basis and accumulate the repeated symbols. In the case of the (n, 4) code, the controller 1502 controls the accumulator 201 to split the (n, 4) code symbols on a 15-symbol basis and accumulate the repeated symbols. The accumulator 1501 converts the accumulated (n, 4) code or (n, 3) code to a (15, 4) or (7, 3) simplex code. The deinterleaver 1503 recovers the (15, 4) or (7, 3) simplex code in the original code symbol order by reverse column permutation and outputs the recovered (15, 4) or (7, 3) simplex code to the zero inserter 1504.

The (7, 3) code is reversely column-permutated according to the pattern of $$[S_1, S_2, S_4, S_7, S_3, S_5, S_6] \to [S_1, S_2, S_3, S_4, S_5, S_6, S_7] \quad (8)$$

and the (15, 4) code is reversely column-permutated according to the pattern of $$[S_1, S_2, S_4, S_8, S_{14}, S_{13}, S_{11}, S_7, S_5, S_3, S_{12},$$
$$S_{10}, S_{15}, S_9, S_6] \to$$
$$[S_1, S_2, S_3, S_4, S_5, S_6, S_7, S_8, S_9, S_{10}, S_{11},$$
$$S_{12}, S_{13}, S_{14}, S_{15}] \quad (9)$$

The zero inserter 1504 converts the reverse-column-permutated (15, 4) or (7, 3) simplex code to a first-order Reed-Muller code by inserting 0 before the leftmost code symbol of the simplex code received from the deinterleaver 1503.

The IFHT 205 decodes the (16, 4) or (8, 3) first-order Reed-Muller code to the input information bits through inverse fast Hadamard transformation. The inverse fast Hadamard transformation has the advantages of fast decoding of a first-order Reed-Muller code and reducing complexity of a decoding hardware structure for the first-order Reed-Muller code.

As an alternative to transmitting a relative power offset by which the transmission power of a DSCH is determined, the UE may transmit a TPC command for the DSCH directly in the FBI of a UL_DPCCH to the node B. The factors determining the TPC command include the signal strengths of CPICHs, the difference in signal strength between CPICHs, the signal strengths of dedicated pilot channels, and the difference in signal strength between dedicated pilot channels as used in determining $Offset_{channel\ environment}$ 1333. The TPC for the DSCH can be transmitted in each slot or separately in a plurality of slots. In the latter case, the TPC is encoded separately to prevent errors possibly generated during transmission of the TPC in the FBI. The code can be a conventional SSDT ID code or any other code. The TPC is applied to the transmission power of the DSCH at a TPC received time point. In case the UE fails to receive the DSCH in this direct TPC transmission method, a power control loop may be suspended. Then, a relative power offset is transmitted to the node B so that the node can resume transmission of the DSCH with initial power to the UE.

Besides the relative power offset transmission and the direct TPC transmission, TPC related with a DL_DCH can be used to determine the transmission power of a DSCH.

The use of a DL-DCH-related TPC can be considered in two ways.

When the UE is located in the SHO region, the UE transmits TPCs separately or a DL_DCH and a DSCH. According to the WCDMA standards, the UE transmits 1500 TPCs per second. If the UE receives the DSCH and is positioned in the SHO region, some of the 1500 TPCs are used for power control of a DL_DCH from each node B in the active set and the other TPCs for power control of the DSCH. Since the DSCH-related TPCs are useless to the node Bs that do not transmit the DSCH, they neglect the TPCs. For example, 1000 TPCs are assigned to the DL_DCHs and 500 TPCs to the DSCH. The DL-DCH related TPCs are transmitted separately in two parts and the DSCH-related TPCs are transmitted at one time, by way of example. How many TPCs are to be assigned to the DSCH depends on the accuracy with which the transmission power of the DSCH is controlled. The UE or the higher layer of the UTRAN takes the responsibility of making the decision.

In the second method of using the DL_DCH-related TPCs for use in determining the DSCH transmission power, the transmission power of DL-DCHs from all node Bs in the active set are actively managed.

For clarity of description, it is assumed that four node Bs are in the active set. A node B transmitting the DSCH is node B #0, the other node Bs are node B #5, node B #6 and node B #7, and the UE receiving the DSCH is UE #1.

UE #1 receives DL_DCHs from node B #0, node B #5, node B #6, and node B #7, combines them, generates a TPC for controlling the transmission power of DL_DCHs for the four node Bs in the active set. UE #1 also measures the dedicated pilot of each DL_DCH received from node B #0, node B #5, node B #6 and node B #7 and generates a TPC for each node B. The TPC generated after combination of the DL_DCHs and the TPCs for power control of each node B are transmitted, for example, in the order of $TPC_{combine}$, $TPC_{node\ B\ \#0}$, $TPC_{node\ B\ \#5}$, $TPC_{node\ B\ \#6}$, $TPC_{node\ B\ \#7}$, $TPC_{combine}$, $TPC_{node\ B\ \#0}$, $TPC_{node\ B\ \#5}$, $TPC_{node\ B\ \#6}$, $TPC_{node\ B\ \#7}$ ....

$TPC_{combine}$ is used to control the transmission power of the DL_DCHs from all the node Bs in the active set and TPC$_{node\ B\ \#0}$ is used to control the transmission power of the DSCH transmitted from node B #0. The other TPCs are applied to the transmission power of DL_DCHs from the other node Bs at the time they are first admitted to the active set, thereby performing a virtual power control on the DL_DCHs different from the present DL_DCHs. The virtual power control of DL_DCHs in the node Bs except for the DSCH-transmitting node B aims at rapid transmission of the DSCH to UE #1 regardless of any node B to which the DSCH is hard-handed over in the case where the hard handover of the DSCH occurs fast according to the movement of UE #1 in the SHO region.

The advantage of the second DL_DCH-related TPC utilizing method is that the UE reliably receives the DSCH through direct control of the transmission power of the DSCH-transmitting node B and the DSCH can be transmitted immediately with appropriate transmission power regardless of which node B the DSCH is hard-handed over to through direct control of the transmission power of a DL_DCH from each node B in the active set.

In the direct DL_DCH-related TPC transmission method, an offset related with the channel environmental change between the DSCH-transmitting node B and the UE is compensated for through direct power control of the DSCH, but the combining gain of signals from the node Bs in the active set is not compensated for. Thus, the combining gain must be set taking into account the number of the node Bs in the active set.

Three methods of controlling the transmission power of a DSCH have been described so far: the relative power offset transmission, transmission of a TPC for a DSCH in the FBI field of an UL-DCCH, and use of a TPC for a DL_DCH. Aside from them, a fourth method of DSCH transmission power control in the SHO region will be described below.

A UE receiving a DSCH reports information about the channel environment between the UE and node Bs in the active set to a UTRAN so that the UTRAN can determine an appropriate power offset for the DSCH based on the information. Here, the UTRAN is a generic term indicating the elements of a mobile communication network except for UEs in the asynchronous mobile communication standards. The UTRAN receives information about the channel environment between the UE and a DSCH-transmitting node B and the channel environment between the UE and the other node Bs in the active set for a predetermined time period. The UTRAN determines on an appropriate power offset for the node B to transmit the DSCH based on the received information and transmits the power offset information to the DSCH-transmitting node B.

For example, the UE builds the transmission information based on measurements of CPICHs and pilot strengths of DL_DCHs received from the node Bs in the active set.

The UE may determine that the channel condition for the DSCH is good if the present CPICH signal strength from the DSCH-transmitting node B is greater than the CPICH signal strength from the node B at a predetermined previous time point and transmit the present channel condition information to the UTRAN by the FBI of a UL_DPCCH using an SSDT code, a (n, 3) code, or a (n, 4) code. Table 7 is given below to help better understanding of the above-described channel condition determination, on the supposition that the UE can offer six kinds of information, when the UE first enters the SHO region, it determines the channel condition based on the CPICH signal strength at that moment, and afterwards the UE determines the channel condition based on the CPICH signal strength at each channel condition information transmitting time.

TABLE 7

| Difference between threshold and measurement (CPICH signal strength) | Channel condition (judged by UE) | Transmission code | Power offset (determined by UTRAN) |
| --- | --- | --- | --- |
| 6 dB~ | Exceedingly bad | 00000 | 4 dB |
| 4 dB~ | Very bad | 01001 | 4 dB |
| 2 dB~ | Bad | 11011 | 3 dB |
| 0 dB~ | Normal | 10010 | 1 dB |
| −2 dB~ | Good | 00111 | 0 dB |
| −4 dB~ | Very good | 01110 | −2 dB < |

Referring to Table 7, the UTRAN can determine a power offset for the DSCH by analyzing information received from the UE once, or by analyzing a change in information received from the UE a plurality of times. In Table 7, the power offset for the DSCH is less than the CPICH signal strength difference in order not to bring about a rapid change in the transmission power of the DSCH. The power offset can be set to be equal to or larger than the CPICH signal strength difference. With the power offset set to be less than the CPICH signal strength difference, interference with adjacent node Bs is small, while the real transmission power of the DSCH is below a desired level. With the power offset set to be equal to the CPICH signal strength difference, the change in received signals at the UE is reflected as it is, but a power offset without reflecting the difference in data rate between the DPCH and the CPICH can be applied to the DSCH. With the power offset set to be greater than the CPICH signal strength difference, interference with adjacent node Bs is great despite the advantage of reliable reception of the DSCH in the UE.

Besides the strength of the CPICH from the DSCH-transmitting node B as shown in Table 7, the criteria on which to make a decision about the present channel condition include the strengths of CPICHs from all node Bs in the active set, the difference between the CPICH signal strength of the DSCH-transmitting node B and the greatest of CPICH signal strengths of the other node Bs in the active set, the strength of the pilot in a DL_DPCCH from the DSCH-transmitting node B, the strengths of the pilots in DL_DPCCHs from all node Bs in the active set, and the difference between the strength of the pilot in the DL_DCCH from the DSCH-transmitting node B and the greatest of the pilot strengths in the DL_DCCH CPICHs from the other node Bs in the active set.

Figure 6:
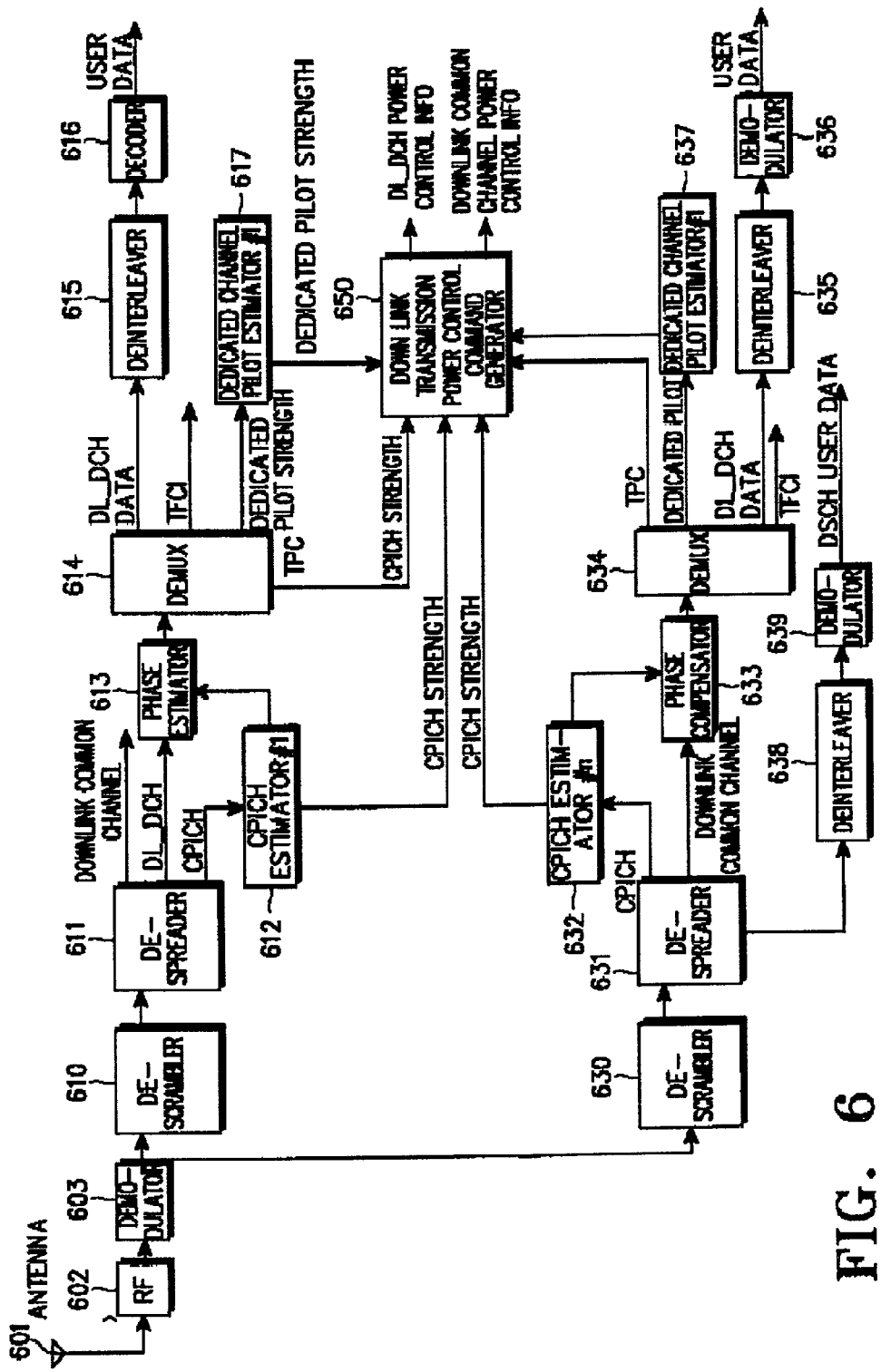
FIG. 6 is a block diagram of a UE receiver according to an embodiment of the present invention.

FIG. 6 is a block diagram of a receiver capable of receiving multipath signals in a UE according to the present invention. The multipath is a generic term that indicates different paths from which a signal transmitted from a node B arrives at the UE directly or bouncing back and forth due to obstacles when the UE is located in a non-SHO region. If the UE is located in the SHO region, the multipath refers to different paths from which signals transmitted from more than one node B in the active set arrive at the UE.

After receiving RF signals from the node Bs in the active set through an antenna 601, the UE converts the RF signals on carriers to baseband signals or intermediate frequency (IF) signals in an RF module 602. A demodulator 603 demodulates the baseband or IF signals and a first descrambler 610 to an nth descrambler 630 descramble the demodulated signals. The number of descramblers to use is determined according to how many forward scrambling codes the UE can descramble at the same time and the number of descramblers varies with manufacturers. The forward scrambling codes are used to identify node Bs in WCDMA. For better understanding of the present invention, it is supposed that the first descrambler 610 descrambles a signal from node B #1 in the active set that does not transmit a DSCH and the nth descrambler 630 descrambles a signal from node B #n transmitting a DSCH.

A first despreader 611 multiplies the output of the first descrambler 610 by the Walsh codes used in a transmitter of node B #1, thereby identifying the downlink channels. The Walsh codes for channelization are also called OVSF (Orthogonal Variable Spreading Factor) codes in WCDMA and their length varies with the data rates of the channels. The output of the first despreader 611 may include a downlink common channel signal, a DL_DCH, and a CPICH. The downlink common channel is a broadcasting channel transmitting the system information of node B #1, a paging channel transmitting signaling information to the UE, or a forward access channel. The DL_DCH is a dedicated channel transmitted from node B #1 to the UE.

A first CPICH estimator 612 receives the CPICH from the first despreader 611 and estimates the phase shift of the received signal caused by the channel environmental change between the UE and node B #1 and the strength of the CPICH. A phase compensator 613 compensates the phase of the downlink dedicated channel from node B #1 according to the estimated phase of the node B #1 transmission signal. Meanwhile, the estimated common pilot signal strength is used as material from which downlink transmission power control information is generated in a downlink TPC command generator 650. A demultiplexer (DEMUX) 614 demultiplexes the phase-compensated DL_DCH signal into a DL_DPDCH and a DL_DPCCH. Prior to demultiplexing, the DL_DCH is a time-multiplexed signal of the DL_DPDCH and the DL_DPCCH. The output of the DEMUX 614 includes a DL_DCH data field, a TFCI, a dedicated channel pilot, and a TPC. The DL_DCH data field is deinterleaved in a deinterleaver 615, decoded to the original data before channel encoding in a decoder 616, and transmitted to the higher layer of the UE. The TFCI output from the DEMUX 614 is interpreted at a frame level to be used for interpretation of transport channels with different data rates transmitted on the DL_DPDCH. A first dedicated channel pilot estimator 617 estimates the strength of the dedicated channel pilot received from the DEMUX 614. The estimated dedicated channel pilot signal strength is used by the downlink TPC command generator 650 to generate the downlink transmission power control information or downlink channel information. The TPC output from the DEMUC 614 is an uplink power control command transmitted from node B #1 to control the uplink signal power of the UE. The TPC is used as both an uplink transmission power control command and for generating the downlink transmission power control information in the downlink TPC command generator 650.

In the meantime, the nth descrambler 630 descrambles a downlink signal received from node B #n in the same manner as in the first descrambler 610. An nth despreader 631 outputs a CPICH, a DL_DCH, a downlink common channel, and a DSCH separately from the descrambled signal in the same manner as in the first despreader 611. The CPICH output from the nth despreader 631 is applied to the input of an nth common pilot channel estimator 632. The nth common pilot channel estimator 632 outputs information about the phase shift of the received signal caused by the channel environmental change between the UE and node B #n to be used as material from which the downlink TPC command generator 650 generates the downlink transmission power control information. The nth CPICH estimator 632 operates in the same manner as the first CPICH estimator 612. The DL_DCH signal output from the nth despreader 631 is separated into a TPC, a dedicated channel pilot, a DL_DCH data field, and a TFCI through a phase compensator 633 and a DEMUX 634. The phase compensator 633 and the DEMUX 634 execute the same functions as the phase compensator 613 and the DEMUX 614, respectively. The DL_DCH data field is deinterleaved in a deinterleaver 635, decoded to the original data before channel encoding in a decoder 636, and transmitted to the higher layer of the UE. The TFCI output from the DEMUX 634 is interpreted at a frame level to be used for interpretation of transport channels with different data rates transmitted on the DL_DPDCH. An nth dedicated channel pilot estimator 637 estimates the strength of the dedicated channel pilot received from the DEMUX 634 in the same manner as the first dedicated channel pilot estimator 617. The estimated dedicated channel pilot signal strength is used by the downlink TPC command generator 650 to generate the downlink transmission power control information. The TPC output from the DEMUC 634 is an uplink power control command transmitted from node B #n to control the uplink signal power of the UE. The TPC is used as both an uplink transmission power control command and for generating the downlink transmission power control information in the downlink TPC command generator 650. The downlink common channel signal output from the nth despreader 631 can be a broadcasting channel or a forward access channel. The broadcasting channel transmits system information and the forward access channel transmits signaling information from the higher layer of the node B or a higher layer in a mobile communication network to the UE. The DSCH output from the nth despreader 631 is interleaved in a deinterleaver 638, decoded in a decoder 639, and then transmitted to the higher layer of the UE. The DSCH transmits only user data. The deinterleaver 638 and the decoder 639 operate in the same manner as the deinterleavers 615 and 635 and the decoders 616 and 636, respectively.

The downlink TPC command generator 650, when the UE moves to the SHO region and receives signals from a new node B as well as from an old node B, receives TPCs, dedicated channel pilot signal strengths, and CPICH signal strengths with regard to node Bs #1 through B #n and generates DL_DPCCH power control information, DSCH power control information bound with the DL_DPCCH power control, and information about the downlink channel on which the DSCH is received. More specifically, the strengths of the dedicated channel pilot signals from node B #1 through node B #n are summed and compared with a desired DL_DCH reception strength. If the sum is less than the desired DL_DCH reception strength, DL_DCH power control information commanding a downlink transmission power increase is generated. Otherwise, DL_DCH power control information commanding a downlink transmission power decrease is generated. The downlink TPC command generator 650 also generates DSCH power control information which can be considered in three ways.

(1) Information about a relative power offset for the DSCH with respect to the DL_DCH. The relative power offset is determined using the methods described referring to FIGS. 4 and 13. (2) TPC information is directly transmitted by the FBI on a UL_DPCCH for power control of the DSCH. The TPC is determined based on CPICH signal strengths, CPICH signal strength difference, dedicated pilot channel signal strengths, and dedicated pilot channel signal strength difference as used for determination of Offset$_{channel\ environment}$ 1333 of FIG. 13. The TPC for the DSCH is transmitted in each slot or separately in a plurality of slots. In the latter case, the TPC is separately coded to prevent errors during TPC transmission in the FBI field. The code is a conventional SSDT ID code or any other code including a (n, 3) code and a (n, 4) code proposed by the present invention. The TPC is applied to the transmission power of the DSCH at the TPC reception time point. In case a power control loop is suspended due to failure in receiving the DSCH at the UE, a relative power offset is transmitted for power control of the DSCH and the node B sets an initial power level when resuming transmission of the DSCH to the UE. (3) Information about the downlink channel with the DSCH. If not the UE but the UTRAN determines a power offset for the DSCH, the downlink channel information is used in making the decision.

Figure 7:
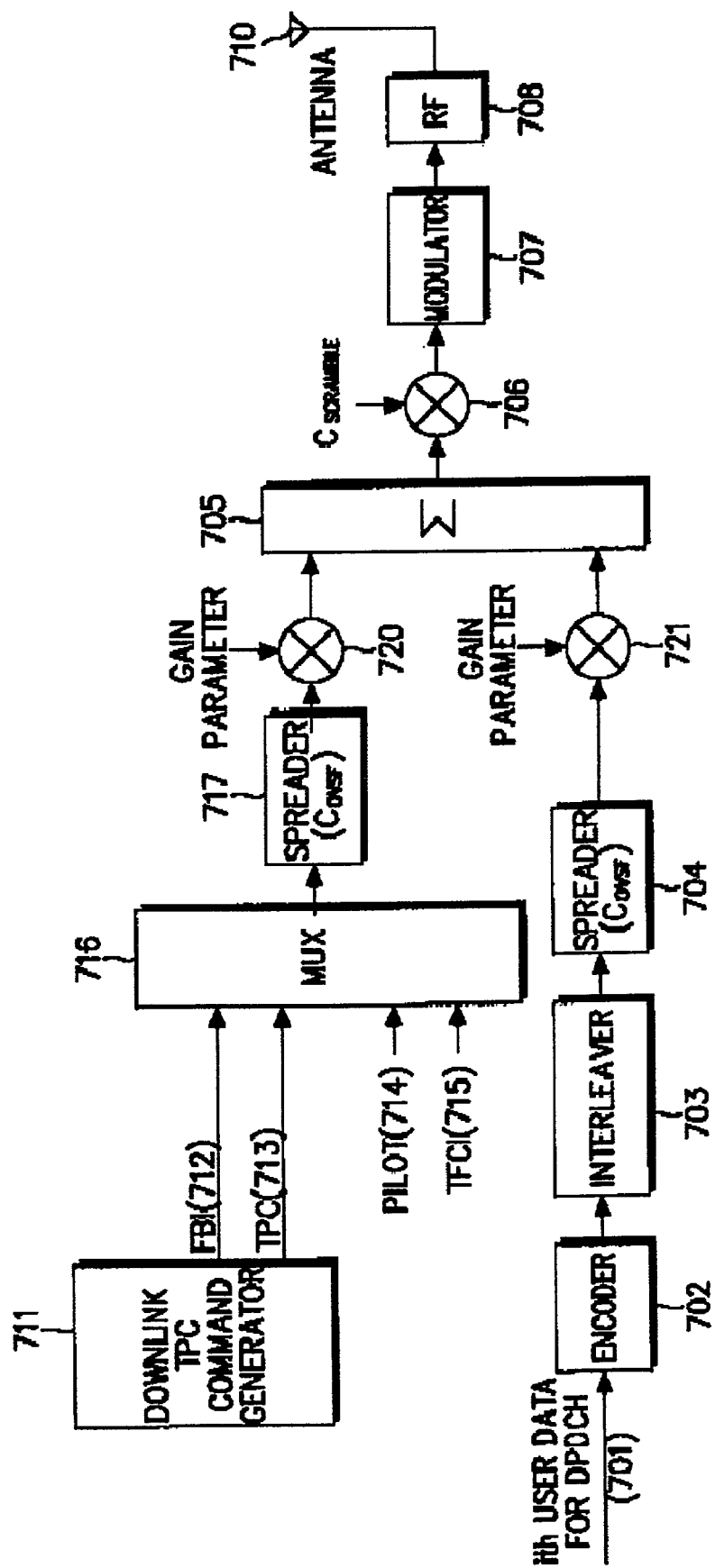
FIG. 7 is a block diagram of a UE transmitter according to an embodiment of the present invention.

FIG. 7 is a block diagram of a transmitter in the UE according to the present invention.

Referring to FIG. 7, a downlink TPC command generator 711 receives the DL_DCH power control information and DSCH power control information from the downlink TPC command generator 650 shown in FIG. 6 and converts the received information to a DL_DCH power control command, a DSCH power control command, a code word representing a relative power offset or downlink channel information, and the downlink channel information. The DL_DCH power control command is broadcast to all node Bs in the active set by the TFC field of a UL_DPCCH. The DSCH power control command or the codeword representing the relative power offset, and the downlink channel information are determined in the downlink TPC command generator 650. The DSCH power control command can be transmitted in each slot, or coded and transmitted separately in a plurality of slots to increase reliability. The updating period of the codeword representing the relative offset or the downlink channel information is determined according to code length or by a higher layer. The codeword is transmitted separately in a plurality of slots according to its updating period. The downlink TPC command generator 711 outputs the DSCH power control command or the codeword representing the relative power offset for the FBI field of a UL_DPCCH and the DL_DCH power control command for the TPC field of the UL_DPCCH. A multiplexer (MUX) 716 multiplexes the output of the downlink TPC command generator 711 with a pilot 714 and a TFCI 715 received from the physical layer of the UE, thereby producing data for the UL_DPCCH. A spreader 717 spreads the UL_DPCCH data with a corresponding OVSF code. A multiplier 720 multiplies the spread data by a transmission power gain for controlling the transmission power of the UL_DPCCH. User data 701 for the UL_DPDCH is encoded in an encoder 702, interleaved in an interleaver 703, and spread with an OVSF code suitable for the data rate of the UL_DPDCH in a spreader 704. A multiplier 721 multiplies the spread signal with a transmission gain to control the transmission power of the UL_DPDCH. The UL DPDCH and the UL DPCCH are summed in a summer 705. A scrambler 721 scrambles the sum with a scrambling code for a UL_DCH. The scrambled signal is modulated in a modulator 707, multiplied by a carrier in an RF module 708, and broadcast to the node Bs through an antenna 710.

Figure 8:
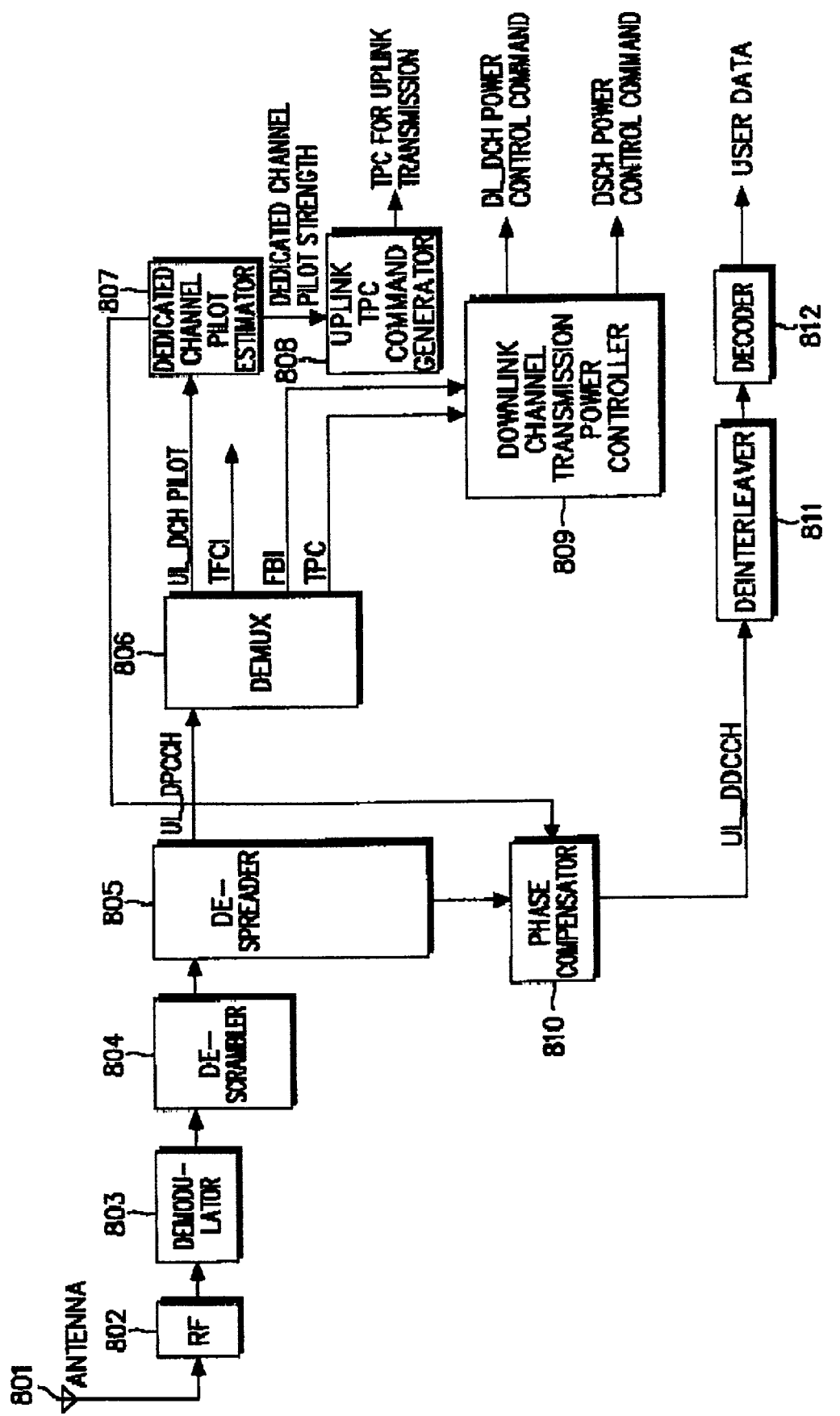
FIG. 8 is a block diagram of a receiver for a node B according to an embodiment of the present invention.

FIG. 8 is a block diagram of a receiver for a node B according to an embodiment of the present invention.

Referring to FIG. 8, a signal received from the UE through an antenna 801 is converted to an IF signal or a baseband signal in an RF module 802, demodulated in a demodulator 803, and descrambled in a descrambler 804. The same scrambling code as used in the multiplier 706 of the UE shown in FIG. 7 is applied to the descrambling in the receiver. The scrambling code identifies the signal from the UE. The descrambled signal is separated into a UL_DPCCH and a UL_DPDCH in a despreader 805.

A DEMUX 806 demultiplexes the UL_DPCCH received from the despreader 805 into an uplink dedicated channel pilot, a TFCI, an FBI, and a TPC. From the uplink dedicated channel pilot, a dedicated channel pilot estimator 807 estimates the signal phase shift caused by the channel environmental change between the UE and the node B and the strength of the uplink dedicated channel pilot signal. A phase compensator 810 compensates the phase of the UL_DPDCH received from the despreader 805 with the estimated phase shift value. Since the UL_DPDCH and the UL_DPCCH arrive at the node B in the same channel environment, the phase distortion of the UL_DPDCH caused by the channel environmental change between the UE and the node B can be compensated with the estimated phase shift value received from the dedicated channel pilot estimator 807.

An uplink TPC command generator 808 utilizes the dedicated channel pilot signal strength received from the dedicated channel pilot estimator 807 as data from which a TPC for uplink transmission power control is generated. Meanwhile, a downlink channel transmission power controller 809 utilizes the FBI and TPC received from the DEMUX 806 to generate a DL_DCH power control command and a DSCH power control command, respectively.

The downlink channel transmission power controller 809 generates a DSCH transmission power control command based on the FBI information received from the DEMUX 806. The FBI information can be downlink channel information, and a relative power offset for a DSCH in connection with a DL_DCH or a TPC command for the DSCH. In the case where the FBI information includes the relative power offset for the DSCH and the downlink channel information, the relative power offset and downlink channel information is encoded to an SSDT ID code, a (n, 3) code, a (n, 4) code, or any other code prior to transmission. Therefore, the relative power offset information and the downlink channel information is used in the downlink channel transmission power controller 809 after decoding. The downlink channel information is not used in the node B at first, but becomes data from which an RNC determines a power offset for the DSCH. The RNC notifies the node B of the determined power offset. A DL_DCH power control command is transmitted in the TPC field of the UL_DCH for use in controlling the transmission power of the DL_DCH. Then, the UL_DCH signal output from a phase compensator 810 is deinterleaved in a deinterleaver 811, decoded in a decoder 812, and transmitted to the higher layer of the node B.

Figure 9:
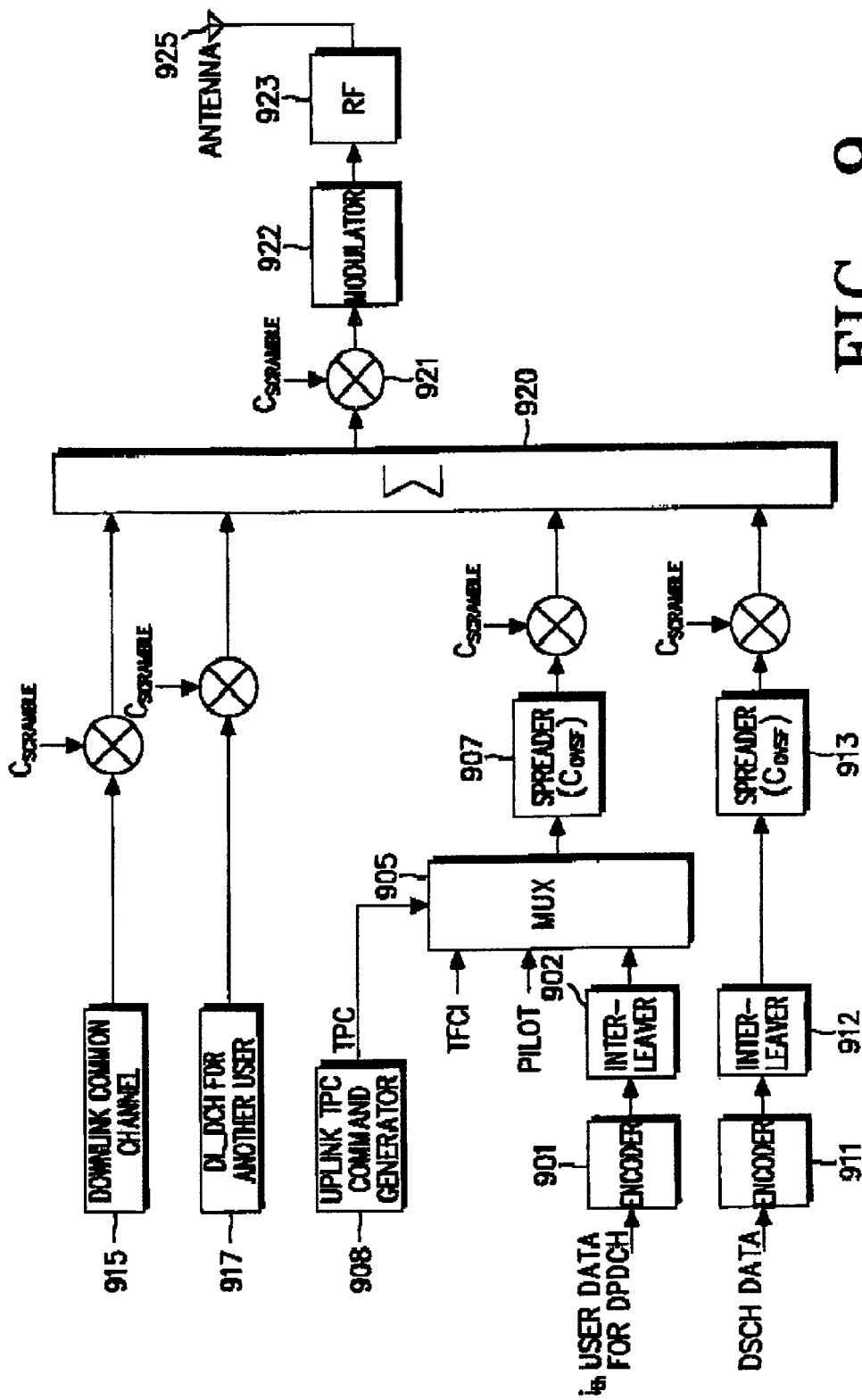
FIG. 9 is a block diagram of a transmitter for the node B according to an embodiment of the present invention.

FIG. 9 is a block diagram of a transmitter for the node B according to an embodiment of the present invention.

Referring to FIG. 9, user data to be transmitted on a DL_DPDCH is encoded in an encoder 911 and interleaved in an interleaver 902. The MUX 905 multiplexes a TFCI 904, a pilot 903, a TPC for power control of a UL_DCH received from an uplink TPC command generator 906, and the DL_DPDCH received from the interleaver 902 and generates a DL_DCH. The uplink TPC command generator 906 is the uplink TPC command generator 808 shown in FIG. 8. It sets a TPC based on the dedicated pilot channel signal strength of a UL_DPCCH and transmits the TPC on a DL_DPCCH of a DL_DCH. The DL_DCH signal output from the MUX 905 is spread with a corresponding OVSF code in a spreader 907, multiplied by a channel gain set to control the transmission power of the DL_DCH in a multiplier 932, and fed to a summer 920. The channel gain is set in accordance with the UL_DCH power control command output from the uplink channel transmission power controller 809 shown in FIG. 8.

An encoder 911 encodes DSCH data to be transmitted from the node B to the UE. The encoded DSCH is interleaved in an interleaver 912 and spread with a corresponding OVSH code in a spreader 913. A multiplier 933 multiplies the spread signal by a channel gain for power control of the DSCH. The channel gain is set in accordance with the DSCH power control command output from the downlink channel transmission power controller 809 of FIG. 8.

Downlink common channels 915 are multiplied by a channel gain in a multiplier 930. The downlink common channels include a primary common control physical channel on which a broadcasting channel is transmitted, a secondary common control physical channel on which a forward access channel and a paging channel are transmitted, and a common pilot channel. A dedicated channel for another user 917 is directed to another user within the node B. After encoding, interleaving and spreading, the dedicated channel is multiplied by a corresponding channel gain in a multiplier 931.

A summer 920 sums the downlink common channels, the DL_DCHs, and the DSCH. A multiplier 921 multiplies the sum with a scrambling code assigned to the node B. A modulator 922 modulates the scrambled signal. An RF module 923 loads the modulated downlink signal by carriers and transmits them to the UEs in the node B through an antenna 925.

Figure 10:
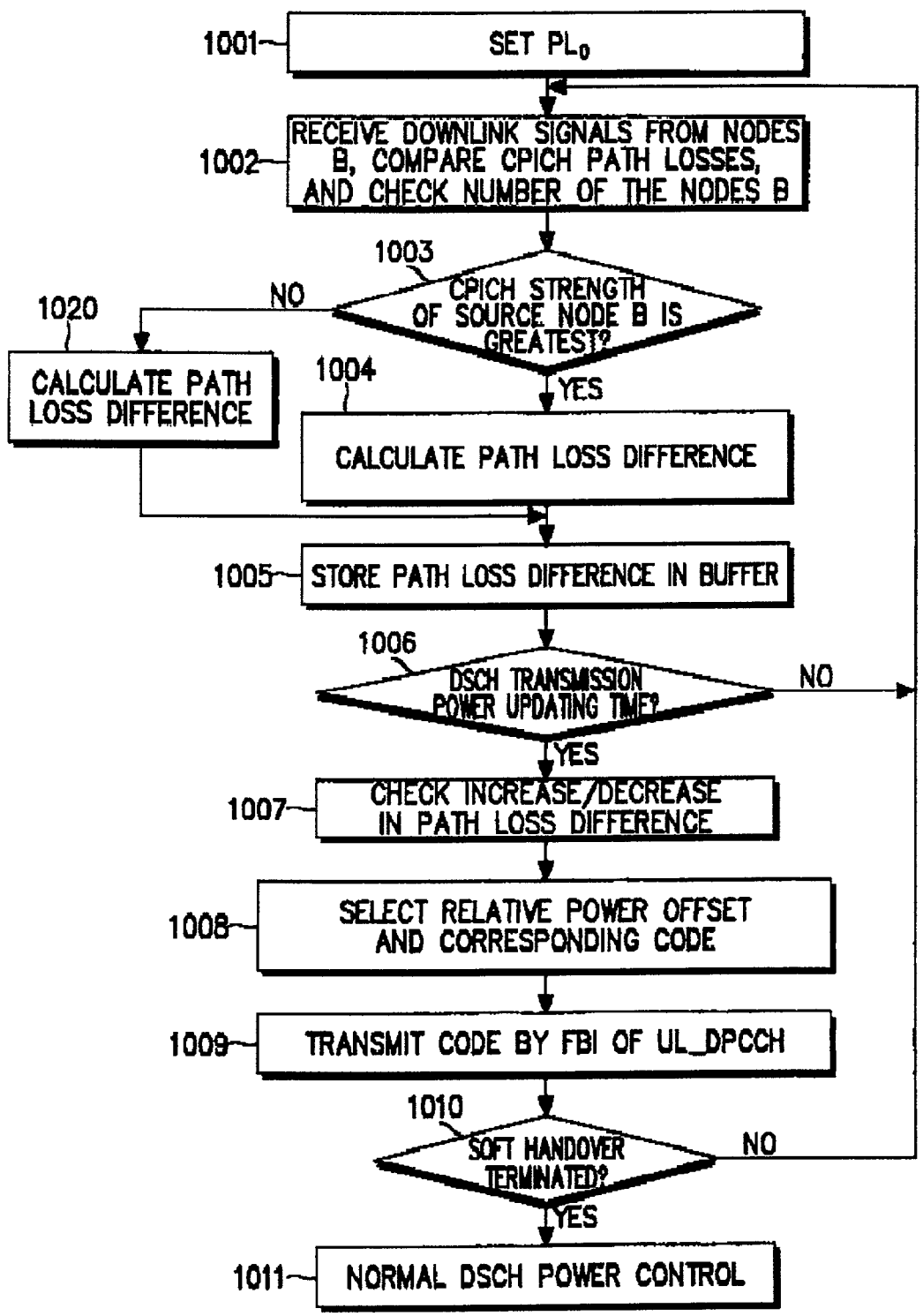
FIG. 10 is a flowchart illustrating an algorithm of determining a relative power offset for a DSCH in the UE according to an embodiment of the present invention.

FIG. 10 is a flowchart illustrating an algorithm of determining a relative power offset for a DSCH by measuring the signal strengths of CPICHs from node Bs in an active set in a UE according to an embodiment of the present invention.

Referring to FIG. 10, the UE receives a signaling message related with an SHO starting point from the UTRAN and then sets $PL_0$ at the SHO starting time in step 1001. The UTRAN collectively refers to all asynchronous mobile communication network elements except for UEs in WCDMA. The node B also belongs to the UTRAN. $PL_0$ is defined as the difference between the CPICH signal strength from a DSCH-transmitting node B and the greatest of CPICH signal strengths from the other node Bs in the active set.

In step 1002, the UE measures the strengths of downlink transmission signals and CPICHs from the node Bs in the active set and checks the number of the node Bs. The number of the node Bs is updated in accordance with a command generated from the UTRAN and known to the UE.

In step 1003, the UE checks whether the CPICH signal strength from the DSCH-transmitting node B is the greatest. If it is, the UE calculates the difference between the CPICH signal strength from the DSCH-transmitting node B and the greatest of CPICH signals strengths from the other node Bs in the active set in step 1004. On the other hand, if the CPICH signal strength from the DSCH-transmitting node B is equal to or less than the greatest of CPICH strengths from the other node Bs in step 1003, the UE calculates the difference between the CPICH signal strength from the DSCH-transmitting node B and the greatest of CPICH signal strengths from the other node Bs in the active set in step 1020. The difference obtained in step 1004 or 1020 is stored in a buffer of the UE in step 1005.

The UE determines whether it is time to update a relative power offset for the DSCH in step 1006. The relative power offset updating period is determined according to the length of the FBI field of a UL_DPCCH, the length of a relative power offset codeword transmitted in the S field of the FBI, and scheduling by the UTRAN. If the updating time has not come yet, the UE returns to step 1002. At the relative power offset updating time in step 1006, the UE checks a change in the path loss difference stored in the buffer by assigning a higher weight to the latest path loss difference stored in the buffer in step 1007.

The UE determines a power offset according to the channel environmental change based on the path loss difference and a power offset according to the number of the node Bs in the active set and the reception power of the dedicated pilot signals received on DL_DCHs from the node Bs and selects a relative offset in correspondence with the two power offsets in step 1008. After appropriately quantizing the selected relative power offset, the UE selects a code corresponding to the relative power offset in an internal relative power offset table. The channel environment-related power offset reflecting the path loss difference can be $Offset_{channel\ environment}$ 1333 and the power offset determined considering a combining gain can be $Offset_{combining\ gain}$ 1332. Table 4 can be used as the relative power offset table in step 1008.

In step 1009, the UE transmits the relative power offset codeword on the FBI of a UL_DPCCH for the relative power offset updating period. The UE checks whether the UE is out of an SHO region in step 1010. If the SHO is not over, the UE returns to step 1002. If the SHO is over, the UE performs a normal DSCH power control, that is, by use of only a power offset determined by the transmission power of a DL_DCH assigned in connection with the DSCH and the difference between the transmission power of the DL_DCH and the DSCH in step 1011. Then the node B controls the transmission power of the DSCH based on the power offset information and a TPC for the DL_DCH transmitted from the UE.

Figure 11:
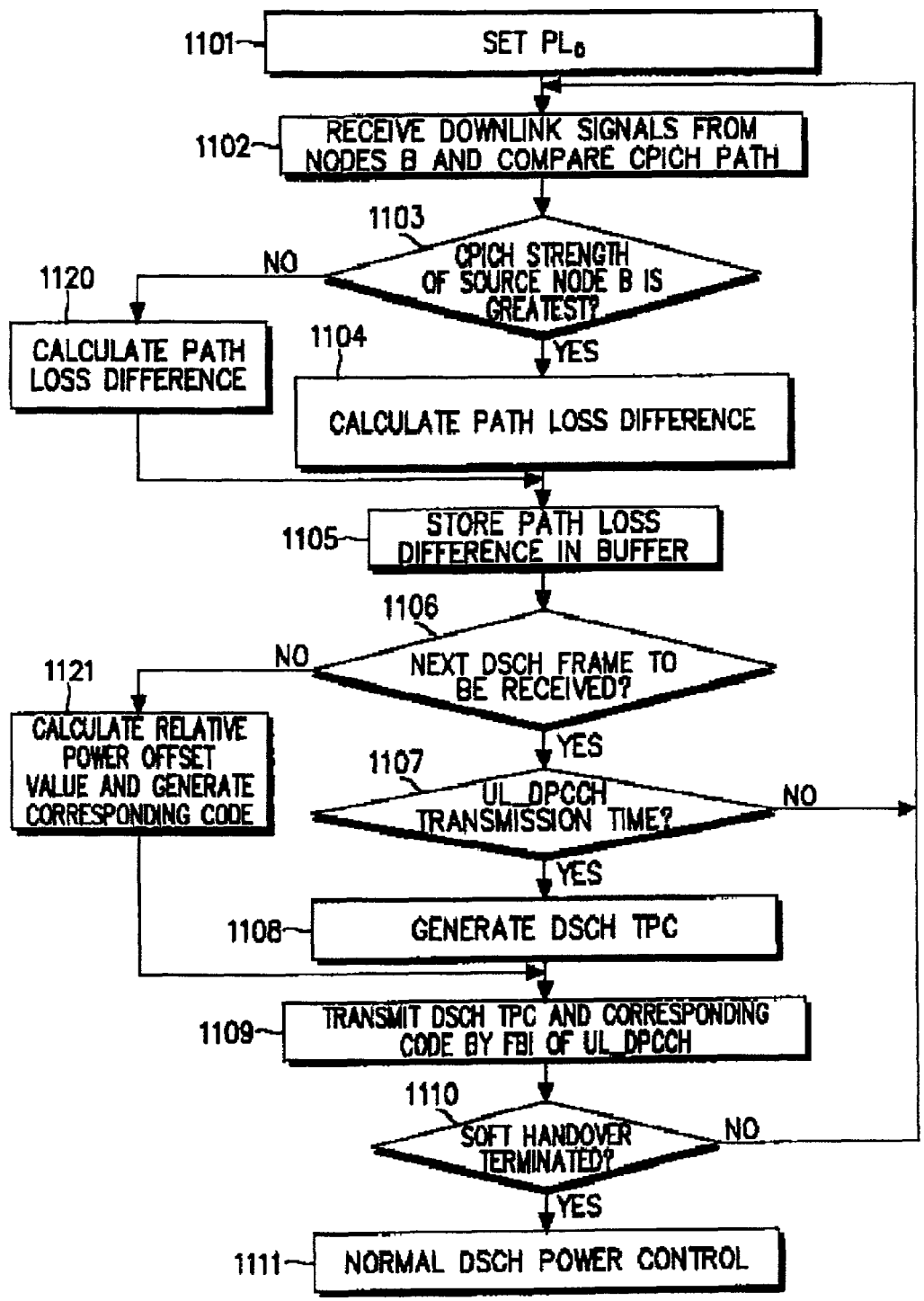
FIG. 11 is a flowchart illustrating an algorithm of directly transmitting a DSCH power control command in the UE according to another embodiment of the present invention.

FIG. 11 is a flowchart illustrating an algorithm of directly transmitting a DSCH power control command in the FBI field of a UL_DPCCH in a UE according to another embodiment of the present invention.

Referring to FIG. 11, the UE receives a signaling message related with an SHO starting point from the UTRAN and then sets $PL_0$ at the SHO starting time in step 1101. The UTRAN collectively refers to all asynchronous mobile communication network elements except for UEs in WCDMA. The node B also belongs to the UTRAN. $PL_0$ is defined as the difference between the CPICH signal strength from the DSCH-transmitting node B and the greatest of CPICH signal strengths from the other node Bs in the active set.

In step 1102, the UE measures the strengths of downlink transmission signals and CPICHs from the node Bs in the active set and checks the number of the node Bs. The number of the node Bs is updated in accordance with a command generated from the UTRAN and known to the UE. In step 1103, the UE checks whether the CPICH signal strength from the DSCH-transmitting node B is the greatest. If it is, the UE calculates the difference between the CPICH signal strength from the DSCH-transmitting node B and the greatest of CPICH signal strengths from the other node Bs in the active set in step 1104. If the CPICH signal strength from the DSCH-transmitting node B is equal to or less than the greatest of CPICH signal strengths from the other node Bs in step 1103, the UE calculates the difference between the CPICH signal strength from the DSCH-transmitting node B and the greatest of CPICH signal strengths from the other node Bs in the active set in step 1120.

The difference obtained in step 1104 or 1120 is stored in a buffer of the UE in step 1105. In step 1106, the UE determines whether the present DSCH radio frame is followed by another DSCH radio frame. If there exists the following DSCH radio frame, the UE determines whether it is time to transmit a UL_DPCCH in step 1107. The reason for step 1107 is to determine whether to directly transmit a TPC command in the FBI of a UL_DPCCH for power control of the DSCH or transmit a codeword representing the TPC command by a separate encoding method to increase the reliability of the TPC command transmission. If the direct TPC transmission method is adopted, the answer is always in the positive to the question asking whether it is time to transmit the UL_DPCCH. If the TPC encoding method is adopted, the answer is "Yes" or "No" to the same question. If it is not time to transmit the DSCH TPC in step 1107, the UE returns to step 1102. If it is time to transmit the DSCH TPC, the UE generates a TPC for the DSCH or a corresponding codeword using the values stored in the buffer in step 1108. In step 1109, the TPC or TPC codeword is directly transmitted in the FBI of the UL_DPCCH. In case a power control loop is suspended due to the absence of the following DSCH radio frame in step 1106, a relative power offset is calculated in step 1121 and transmitted in step 1109. For calculation of the relative power offset for power control of the DSCH in step 1121, the UE uses measurements obtained in step 1102 to help the node B to determine the initial transmission power of the next DSCH radio frame even for a non-DSCH transmission period. The relative power offset is transmitted in the FBI of the UL_DPCCH in step 1109.

The UE checks whether it is out of the SHO region in step 1110. If the SHO is notcompleted, the UE returns to step 1102. If the SHO is completed, the UE performs a normal DSCH power control, that is, by use of only a power offset determined by the transmission power of a DL_DCH assigned in connection with the DSCH and the difference in transmission power between the DL_DCH and the DSCH in step 1111. Then the node B controls the transmission power of the DSCH based on the power offset information and a TPC for the DL_DCH transmitted from the UE.

Figure 12:
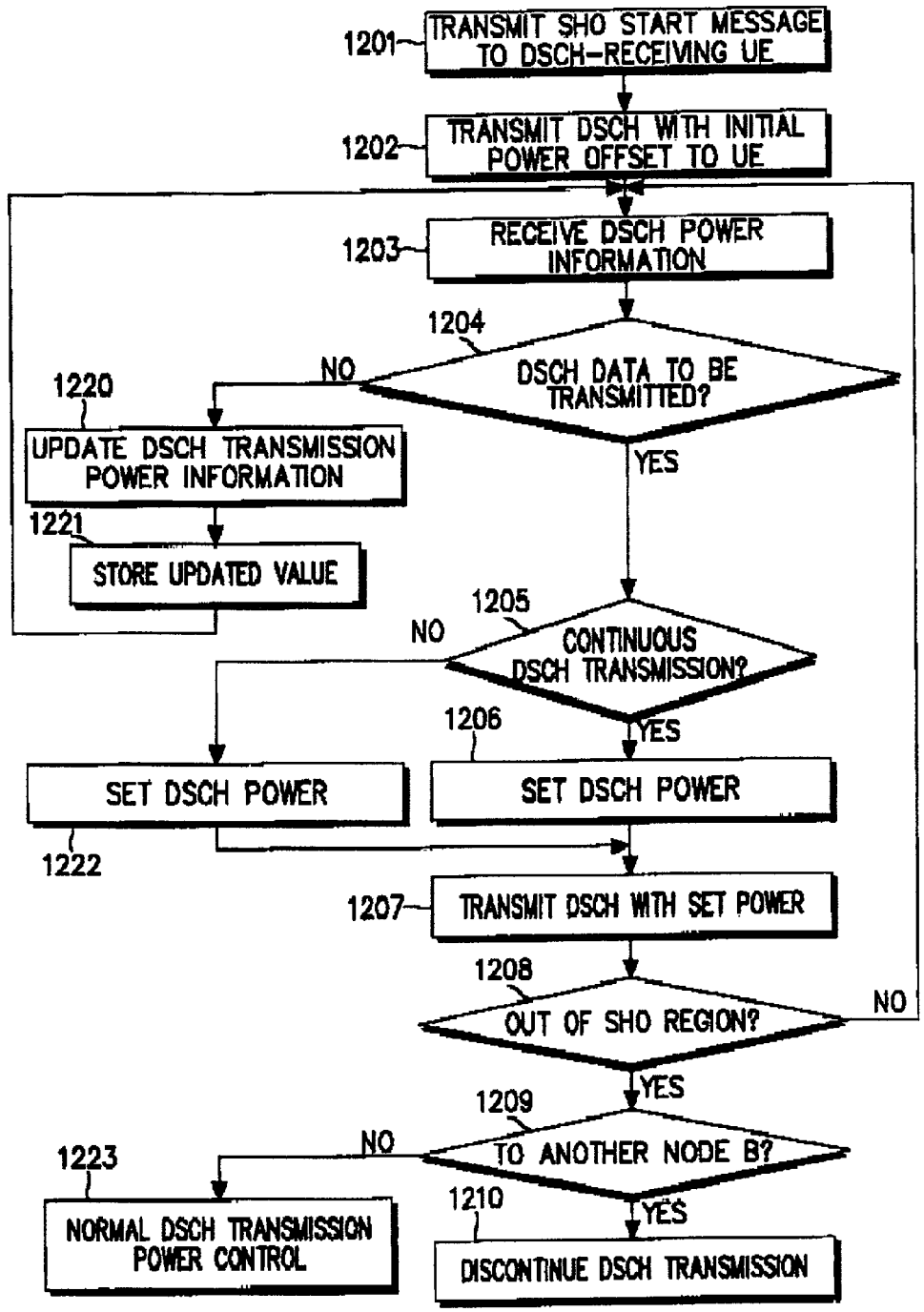
FIG. 12 is a flowchart illustrating an operation of receiving a relative power offset or a TPC for a DSCH from the UE in the UTRAN (UMTS (Universal Mobile Telecommunications System) Terrestrial Radio Access Network) according to the embodiments of the present invention.

FIG. 12 is a flowchart illustrating an operation of receiving a relative power offset or a TPC for a DSCH from the UE in the UTRAN according to the embodiments of the present invention.

Referring to FIG. 12, the UTRAN transmits an SHO start message to the UE when the UE moves to an SHO region in step 1201. In step 1202, the UTRAN transmits the DSCH with an initial relative power offset to the UE in the SHO region. The initial relative power offset can be set to 0 dB, or the minimum value of an offset calculated according to a combining gain, 1 dB. The UTRAN receives DSCH transmission power information from the UE in step 1203. The DSCH transmission power information may be a codeword representing a relative power offset or a TPC for the DSCH power control. In step 1204, the UTRAN determines whether it has DSCH data to transmit to the UE. In the presence of the DSCH data, the UTRAN determines whether it continuously transmits the DSCH to the UE in step 1205. Continuous DSCH transmission means that a DSCH frame has been transmitted to the UE previously before the present DSCH frame and thus the transmission power information of the previous DSCH frame can be applied to the present DSCH frame. On the contrary, discontinuous DSCH transmission implies that due to the absence of DSCH frames for a while before the present DSCH frame, the initial transmission power of the DSCH must be set using DSCH transmission power information stored in the buffer. In step 1222, the UTRAN determines DSCH transmission power using the DSCH transmission power information stored in the buffer. In the case of continuous DSCH transmission, the UTRAN sets the DSCH transmission power using the DSCH transmission power information received from the UE in step 1206.

If there is no DSCH frame to be transmitted to the UE that transmitted the DSCH transmission power information in step 1204, the UTRAN updates the transmission power information of the latest DSCH transmitted to the UE based on the received DSCH transmission power information in step 1220. In the case where the UE received no DSCH frames before the UTRAN receives the DSCH transmission power information, the UTRAN sets initial transmission power for the DSCH frame based on the received DSCH transmission power information. The initial power value is updated according to the information received from the UE. The calculated DSCH transmission power information is stored in the buffer in step 1221 and used in determining the DSCH transmission power in step 1222. Then, the UTRAN returns to step 1203 and repeats the above procedure.

After determining the transmission power of the DSCH in step 1222 or 1206, the UTRAN transmits the DSCH with the transmission power to the UE in step 1207.

In step 1208, the UTRAN determines whether the UE is out of the SHO region. If the UE still stays in the SHO region, the UTRAN returns to step 1203.

If it is determined that the UE is out of the SHO region in step 1208, the UTRAN checks whether the UE moves to another node B in the active set in step 1209. If it does, the UTRAN releases the DSCH from the UE in step 1210. If the UE returns to the source node B in step 1209, the UTRAN performs a normal DSCH transmission power control in step 1223.

Figure 19:
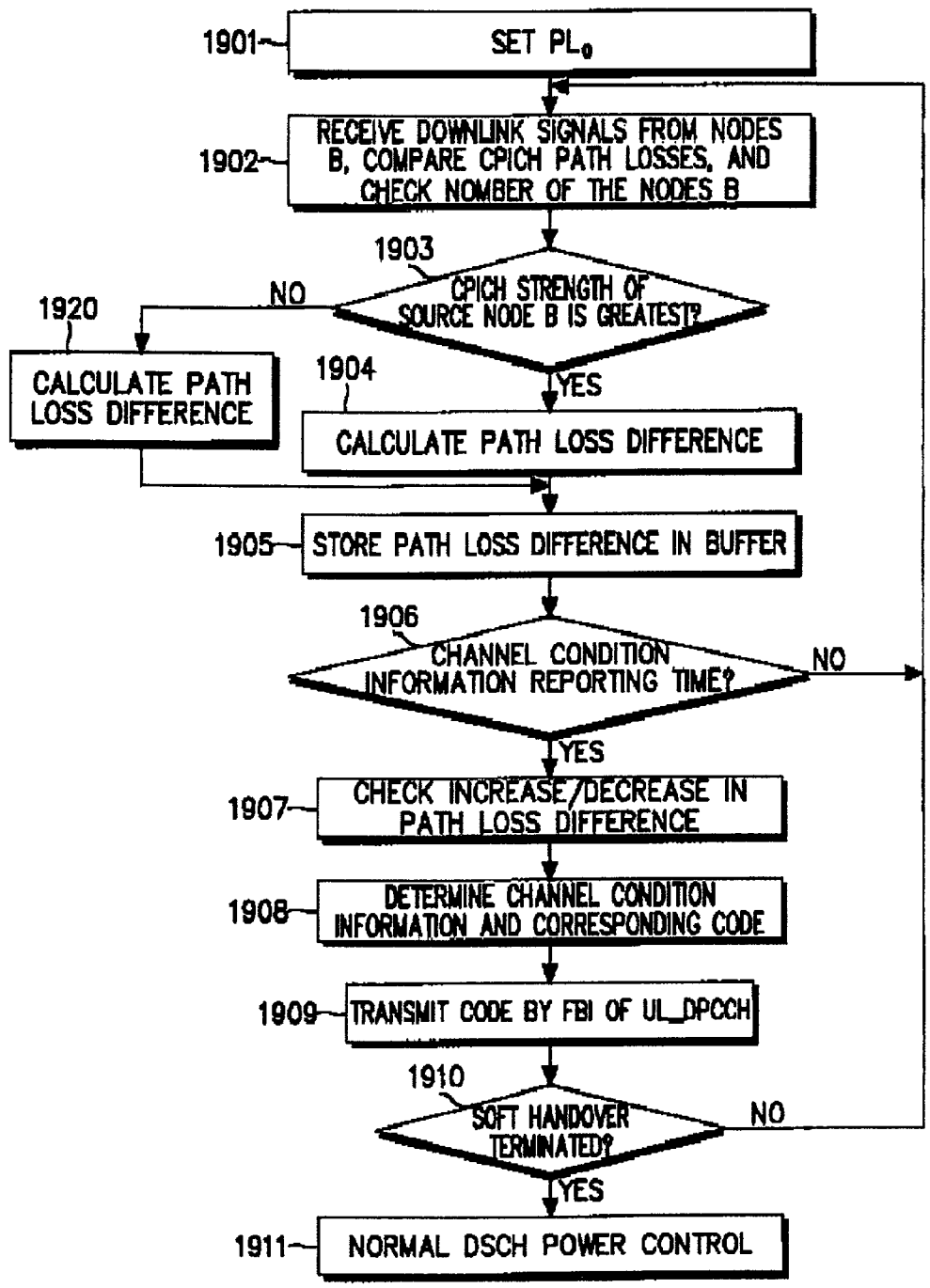
FIG. 19 is a flowchart illustrating an algorithm of estimating a channel condition and reporting the channel condition information to the UTRAN for use in determining a power offset for a DSCH according to a third embodiment of the present invention.

FIG. 19 is a flowchart illustrating a UE algorithm of estimating a channel condition by measuring the signal strengths of CPICHs from node Bs in the active set and reporting the channel condition information to the UTRAN so that the UTRAN determines a power offset for a DSCH according to a third embodiment of the present invention.

Referring to FIG. 19, the UE receives a signaling message related with an SHO starting point from the UTRAN and then sets $PL_0$ at the SHO starting time in step 1901. The UTRAN collectively refers to all asynchronous mobile communication network elements except for UEs in WCDMA. The node B also belongs to the UTRAN. $PL_0$ is defined as the difference between the CPICH signal strength from the DSCH-transmitting node B and the greatest of CPICH signal strengths from the other node Bs in the active set.

In step 1902, the UE measures the strengths of downlink transmission signals and CPICHs from the node Bs in the active set and checks the number of the node Bs. The number of the node Bs is updated in accordance with a command generated from the UTRAN and known to the UE.

In step 1903, the UE checks whether the CPICH signal strength from the DSCH-transmitting node B is the greatest. If it is, the UE calculates the difference between the CPICH signal strength from the DSCH-transmitting node B and the greatest of CPICH signals strengths from the other node Bs in the active set in step 1904. If the CPICH signal strength from the DSCH-transmitting node B is equal to or less than the greatest of CPICH signal strengths from the other node Bs in the active set, the UE calculates the difference between the CPICH signal strength from the DSCH-transmitting node B and the greatest of CPICH signal strengths from the other node Bs in the active set in step 1920. The difference obtained in step 1904 or 1920 is stored in a buffer of the UE in step 1905.

In step 1906, the UE determines whether it is time to transmit the present channel condition information to the UTRAN. The channel condition information is determined according to the length of the FBI of a UL_DPCCH, the length of a codeword representing the channel condition transmitted in the S field of the FBI, and scheduling by the UTRAN. If it is not time to transmit the channel condition information in step 1906, the UE returns to step 1902. If it is time to transmit the channel condition information in step 1906, the UE checks whether the path loss difference has been increased or decreased referring to the path loss difference stored in the buffer in step 1907. At this time, the UE assigns a higher weight to the latest stored path loss difference in checking the path loss difference change.

In step 1908, the UE estimates the channel environment between the UE and the DSCH-transmitting node B considering the estimated channel condition change, the number of the node Bs in the active set, and the reception power of the dedicated pilot signals on DL_DCHs received from the node Bs, quantizes the channel environment information appropriately, and selects a code corresponding to the quantized value.

In step 1909, the UE transmits the channel environment information code in the FBI field of a UL_DPCCH for a channel environment information updating period. The UE checks whether it is out of the SHO region in step 1910. If the SHO is not completed, the UE returns to step 1902. On the other hand, if it is determined that the SHO is completed, the UE performs a normal DSCH transmission power control, that is, by use of only a power offset determined by the transmission power of a DL_DCH assigned in connection with the DSCH and the difference in transmission power between the DL_DCH and the DSCH in step 1911. Then, the UTRAN determines the transmission power of the DSCH according to the power offset information and a TPC for the DL_DCH transmitted from the UE.

Figure 20:
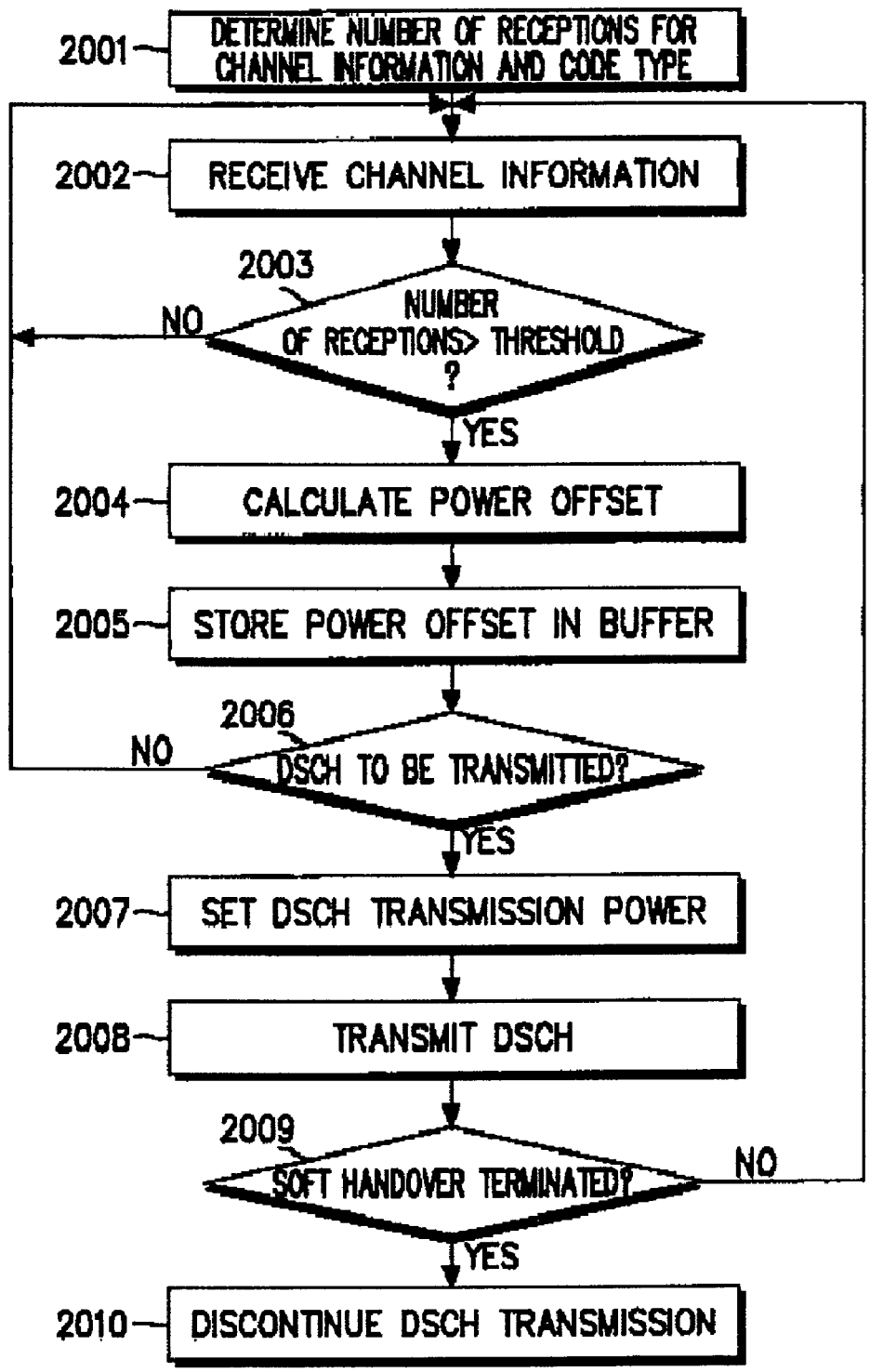
FIG. 20 is a flowchart illustrating an operation of calculating a power offset for a DSCH based on the channel environment information received from the UE in the UTRAN according to the third embodiment of the present invention.

FIG. 20 is a flowchart illustrating an operation of calculating a power offset for a DSCH based on the channel environment information received from the UE in the UTRAN according to the third embodiment of the present invention.

Referring to FIG. 20, the UTRAN determines a code type with which the UE is to transmit the channel environment information, notifies the UE of the code type, and determines how many times it is to receive the channel environment information in step 2001. As the channel environment information is received more times, the reliability of a power offset for the DSCH increases. If the UTRAN receives the channel environment information a small number of times, the power offset updating period is short. Therefore, the UTRAN can set the power offset adaptively to the real channel environmental change.

In step 2002, the UTRAN receives coded channel environment information from the UE and decodes it. In step 2003, the UTRAN compares the number of channel environment information receptions with a threshold set in step 2001. If the number of receptions is less than the threshold, the UTRAN stays in step 2002 and if the number of receptions is greater than the threshold, the UTRAN calculates a power offset for the DSCH based on the channel environment information in step 2004. The power offset can be calculated by simply checking the channel environmental change or assigning a higher weight to the latest channel environmental information.

The power offset is stored in the buffer in step 2005. The UTRAN checks whether there is a DSCH to be transmitted to the UE in step 2006. In the absence of the DSCH to be transmitted, the UTRAN returns to step 2002. On the other hand, in the presence of the DSCH, the UTRAN determines the transmission power of the DSCH based on the power offset in step 2007 and transmits the DSCH with the transmission power to the UE in step 2008. In step 2009, the UTRAN checks whether the SHO is completed for the UE. If the SHO still proceeds, the UTRAN returns to step 2002. Upon termination of the SHO, the UTRAN operates in one of two ways in step 2010. When the UE moves to another node B, the UTRAN releases the DSCH from the UE. If the UE returns to the source node B transmitting the DSCH, the UTRAN performs a normal DSCH power control, that is, controls the transmission power of the DSCH using only a power offset determined by the transmission power of a DL_DCH assigned in connection with the DSCH and the difference in transmission power between the DL_DCH and the DSCH, and a TPC for the DL_DCH transmitted from the UE.

In accordance with the present invention as described above, a UE receiving a DSCH readily sets a power offset for use in control of the transmission power of the DSCH ideally in an SHO region. Moreover, use of a (n, 3) code or a (n, 4) code for transmission of the power offset ensures transmission reliability and reduces hardware complexity.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of controlling the transmission power of a downlink shared channel (DSCH) in a mobile communication system having a plurality of node Bs and a user equipment (UE) in a soft handover (SHO) region defined as the overlapped area among the cell areas of the node Bs, a first node B transmitting data on the DSCH and a Transmit Power Control (TPC) on a downlink dedicated channel (DL_DCH) to the UE and the other node Bs transmitting TPCs on DL_DCHs to the UE, the method comprising the steps of:

generating DSCH power control information for controlling the transmission power of the DSCH based on a channel condition determined by the reception power of a common pilot channel (CPICH) from the first node B;

transmitting the DSCH power control information to the first node B; and generating a power control command for the next frame using the frame previously received in the absence of the next DSCH frame to be received, wherein the DSCH power control information is generated at updating time points for relative power offset, and the relative power offset is determined based on a path loss difference measured by the difference between the CPICH signal strength from the first node B and the greatest of CPICH signal strengths from the other nodes B.

2. The method of claim 1, wherein the CPICH signal strength difference is stored at each calculation for checking the path loss difference.

3. The method of claim 1, wherein the DSCH power control information is transmitted in a feedback information (FBI) field of an uplink dedicated physical control channel (UL_DPCCH).

4. The method of claim 1, wherein the DSCH power control information is transmitted on an uplink dedicated physical control channel (UL_DPCCH) at a power control information transmission time point when the next DSCH frame is received.

5. The method of claim 4, wherein the DSCH power control information is transmitted by a feedback information (FBI) field of the UL_DPCCH.

6. The method of claim 1, wherein a codeword representing the DSCH power control information is transmitted on an uplink dedicated physical control channel (UL_DPCCH) at a power control information transmission time point when the next DSCH frame is received.

7. The method of claim 6, wherein the codeword representing the DSCH power control information is transmitted by a feedback information (FBI) field of the UL_DPCCH.

8. The method of claim 7, wherein the codeword is generated using a simplex codeword.

9. The method of claim 1, wherein the DSCH transmission power control information is generated and transmitted at a reporting time point based on a channel condition.

10. The method of claim 9, wherein the channel condition is estimated according to the number of all nodes B transmitting the TPCs on the DL_DCHs and the difference between the CPICH signal strength from the first node B and the greatest of CPICH signal strengths from the other nodes B.

11. The method of claim 10, wherein the estimated channel condition value is transmitted by a feedback information (FBI) field of an uplink dedicated physical control channel (UL_DPCCH).

12. The method of claim 11, wherein the estimated channel condition value is encoded using a simplex codeword.

13. The method of claim 9, wherein the reporting time point based on the channel condition is determined by scheduling in a UTRAN (Universal Mobile Telecommunications System (UMTS) Terrestrial Radio Access Network).

14. An apparatus for controlling the transmission power of a downlink shared channel (DSCH) in a mobile communication system having a plurality of nodes B and a user equipment (UE) in a soft handover (SHO) region defined as the overlapped area among the cell areas of the nodes B, a first node B transmitting data on the DSCH and a transmit power control (TPC) on a downlink dedicated channel (DL_DCH) to the UE and the other nodes B transmitting TPCs on DL_DCHs to the UE, the apparatus comprising:
   a pilot channel strength measurer for measuring the strengths of common pilot channels (CPICHs) from the nodes B transmitting the TPCs on the DL_DCHs;
   a CPICH strength change detector for checking whether the strength of the CPICH signal from the first node B received from the pilot channel strength measurer has been increased or decreased;
   an offset determiner for determining whether to increase or decrease a previous offset according to the check result received from the OPICH strength change detector; and
   a transmitter for transmitting a relative power offset received from the offset determiner on an uplink dedicated channel (UL_DCH) to the first node B in order that the first node B changes a predetermined fixed offset value, and uses the changed offset value for controlling the transmission power for data transmitted on the DSCH, wherein the relative power offset is determined based on a path loss difference measured by the difference between the CPICH signal strength from the first node B and the greatest of CPICH signal strengths from the other nodes B.

15. The apparatus of claim 14, wherein the transmitter transmits the offset by a feedback information (FBI) field of the UL_DCH.

16. The apparatus of claim 14, further comprising a simplex encoder for encoding the offset using a simplex codeword.

17. An apparatus for controlling the transmission power of a downlink shared channel (DSCH) in a mobile communication system having a plurality of nodes B and a user equipment (UE) in a soft handover (SHO) region defined as the overlapped area among the cell areas of the nodes B, a first node B transmitting data on the DSCH and a transmit power control (TPC) on a downlink dedicated channel (DL_DCH) to the UE and the other nodes B transmitting TPCs on DL_DCHs to the UE, the apparatus comprising:
   a pilot channel strength measurer for measuring the strengths of common pilot channels (CPICHs) from the nodes B transmitting the TPCs on the DL_DCHs;
   a CPICH strength change detector for checking whether the strength of the CPICH signal from the first node B received from the pilot channel strength measurer has been increased or decreased;
   an offset determiner for determining whether to increase or decrease a previous offset according to the check result received from the CPICH strength change detector;
   a first-order Reed-Muller codeword memory for outputting a code in correspondence with the determined relative power offset; and
   a transmitter for transmitting the code received from the memory on an uplink dedicated channel (UL_DCH) to the first node B in order that the first node B changes a predetermined fixed offset value, and uses the changed offset value for controlling the transmission power for data transmitted on the DSCH,
   wherein the relative power offset is determined based on a path loss difference measured by the difference between the CPICH signal strength from the first node B and the greatest of CPICH signal strengths from the other nodes B.

18. The apparatus of claim 17, wherein the transmitter transmits the offset code by a feedback information (FBI) field of the UL_DCH.

19. A method of transmitting a downlink shared channel (DSCH) power control information in a user equipment (UE) that receives pilot channels (PICHs) and power control bits for controlling uplink channels from nodes B in an active set and receives data on the DSCH from one of the nodes B, the method comprising the steps of:
   generating the DSCH transmission power control information based on the number of the nodes B and a variance in the common pilot channels (CPICH) reception power of the DSCH-transmitting node B;
   transmitting the DSCH transmission power control information to the DSCH-transmitting node B; and
   generating a power control command for the next frame using the frame previously received in the absence of the next DSCH frame to be received.

* * * * *